(12) United States Patent
Sharma et al.

(10) Patent No.: US 10,033,943 B1
(45) Date of Patent: Jul. 24, 2018

(54) ACTIVITY SURFACE DETECTION, DISPLAY AND ENHANCEMENT

(71) Applicant: Tangible Play, Inc., Palo Alto, CA (US)

(72) Inventors: Pramod Kumar Sharma, San Jose, CA (US); Jerome Scholler, San Francisco, CA (US); Conrad Verkler, East Palo Alto, CA (US)

(73) Assignee: Tangible Play, Inc., Palo Alto, CA (US)

( * ) Notice: Subject to any disclaimer, the term of this patent is extended or adjusted under 35 U.S.C. 154(b) by 112 days.

(21) Appl. No.: 14/965,776

(22) Filed: Dec. 10, 2015

Related U.S. Application Data

(63) Continuation-in-part of application No. 14/842,777, filed on Sep. 1, 2015, which is a continuation of
(Continued)

(51) Int. Cl.
| | | |
|---|---|---|
| *G06F 3/033* | (2013.01) | |
| *H04N 5/272* | (2006.01) | |
| *G06T 1/20* | (2006.01) | |
| *G06T 11/60* | (2006.01) | |
| *H04N 7/18* | (2006.01) | |
| *H04N 5/232* | (2006.01) | |
| *H04N 5/14* | (2006.01) | |
| *H04N 5/262* | (2006.01) | |

(52) U.S. Cl.
CPC .............. *H04N 5/272* (2013.01); *G06T 1/20* (2013.01); *G06T 11/60* (2013.01); *H04N 5/142* (2013.01); *H04N 5/23293* (2013.01); *H04N 5/2628* (2013.01); *H04N 7/183* (2013.01)

(58) Field of Classification Search
CPC ...... G06F 3/0346; G06F 3/0304; G06F 3/038; G06F 3/017; G06F 3/0425
See application file for complete search history.

(56) References Cited

U.S. PATENT DOCUMENTS

| | | |
|---|---|---|
| 6,175,954 B1 | 1/2001 | Nelson et al. |
| 7,511,703 B2 | 3/2009 | Wilson et al. |
| (Continued) | | |

FOREIGN PATENT DOCUMENTS

| | | |
|---|---|---|
| WO | 2006027627 A1 | 3/2006 |
| WO | 2015103693 A1 | 7/2015 |

OTHER PUBLICATIONS

Moya, "Tangible user interface", http://en.wikipedia.org/w/index.php?title=Tangible_user_interface&oldid=549052909, Apr. 6, 2013, (5 pages).

(Continued)

*Primary Examiner* — Vijay Shankar
(74) *Attorney, Agent, or Firm* — Patent Law Works LLP

(57) ABSTRACT

Activity surface detection, display, and enhancement implementations are described. In an example implementation, a method determines, using a processor of a computing device, a traceable image and presenting the traceable image in an interface on a display of the computing device; captures, using a video capture device coupled to the computing device, a video stream of a physical activity surface proximate to the computing device; and displays, on the display of the computing device, the captured video stream overlaid with the traceable image in the interface.

22 Claims, 32 Drawing Sheets

Related U.S. Application Data application No. 13/928,111, filed on Jun. 26, 2013, now Pat. No. 9,158,389.

(60) Provisional application No. 62/090,345, filed on Dec. 10, 2014, provisional application No. 61/714,138, filed on Oct. 15, 2012.

(56) References Cited

U.S. PATENT DOCUMENTS

| | | | |
|---|---|---|---|
| 7,777,899 B1 | 8/2010 | Hildreth | |
| 8,126,264 B2 | 2/2012 | Kaftory et al. | |
| 8,274,535 B2 | 9/2012 | Hildreth et al. | |
| 8,384,719 B2 | 2/2013 | Reville et al. | |
| 8,611,587 B2 | 12/2013 | Horovitz | |
| 8,624,932 B2 | 1/2014 | Hildreth et al. | |
| 8,698,873 B2* | 4/2014 | Barrus | H04L 12/1822 250/221 |
| 9,049,482 B2* | 6/2015 | Reichelt | G06T 11/00 |
| 9,158,389 B1 | 10/2015 | Sharma et al. | |
| 9,235,768 B1 | 1/2016 | Pashintsev et al. | |
| 9,354,716 B1* | 5/2016 | Sharma | H04N 5/2252 |
| 9,383,895 B1 | 7/2016 | Vinayak et al. | |
| 9,423,939 B2 | 8/2016 | Schwesinger et al. | |
| 9,552,081 B1* | 1/2017 | Sharma | H04N 5/2252 |
| 9,696,547 B2 | 7/2017 | Kinnebrew et al. | |
| 9,807,130 B2 | 10/2017 | Blattner et al. | |
| 9,824,495 B2 | 11/2017 | Hagbi et al. | |
| 2001/0001303 A1 | 5/2001 | Ohsuga et al. | |
| 2009/0273560 A1 | 11/2009 | Kalanithi et al. | |
| 2009/0315740 A1 | 12/2009 | Hildreth et al. | |
| 2009/0315978 A1 | 12/2009 | Wurmlin et al. | |
| 2010/0066763 A1 | 3/2010 | MacDougall et al. | |
| 2010/0091110 A1 | 4/2010 | Hildreth | |
| 2010/0105525 A1 | 4/2010 | Thukral et al. | |
| 2010/0194863 A1 | 8/2010 | Lopes et al. | |
| 2010/0302247 A1 | 12/2010 | Perez et al. | |
| 2010/0302257 A1 | 12/2010 | Perez et al. | |
| 2010/0303291 A1 | 12/2010 | Margolis | |
| 2011/0298724 A1 | 12/2011 | Ameling et al. | |
| 2012/0069051 A1 | 3/2012 | Hagbi et al. | |
| 2012/0229590 A1* | 9/2012 | Barrus | H04L 12/1822 348/14.08 |
| 2012/0244922 A1 | 9/2012 | Horovitz | |
| 2012/0280948 A1* | 11/2012 | Barrus | G06F 3/04883 345/179 |
| 2013/0215292 A1* | 8/2013 | Reichelt | G06T 11/00 348/239 |
| 2013/0321447 A1 | 12/2013 | Horovitz et al. | |
| 2014/0160122 A1 | 6/2014 | Chou | |
| 2014/0191976 A1* | 7/2014 | Peevers | G10L 21/10 345/173 |
| 2015/0339532 A1 | 11/2015 | Sharma et al. | |
| 2017/0236407 A1 | 8/2017 | Rhoads et al. | |

OTHER PUBLICATIONS

Pedersen, "Grab and Touch: Empirical Research on Tangible Computing and Touch Interaction," Department of Computer Science, Faculty of Science, University of Copenhagen, Denmark, Nov. 2012 (75 pages).

International Search Report and Written Opinion, PCT/US2015/032041, dated Aug. 27, 2015 (14 pages).

International Search Report and Written Opinion, PCT/US2017/024161, dated Jun. 5, 2017 (18 pages).

* cited by examiner

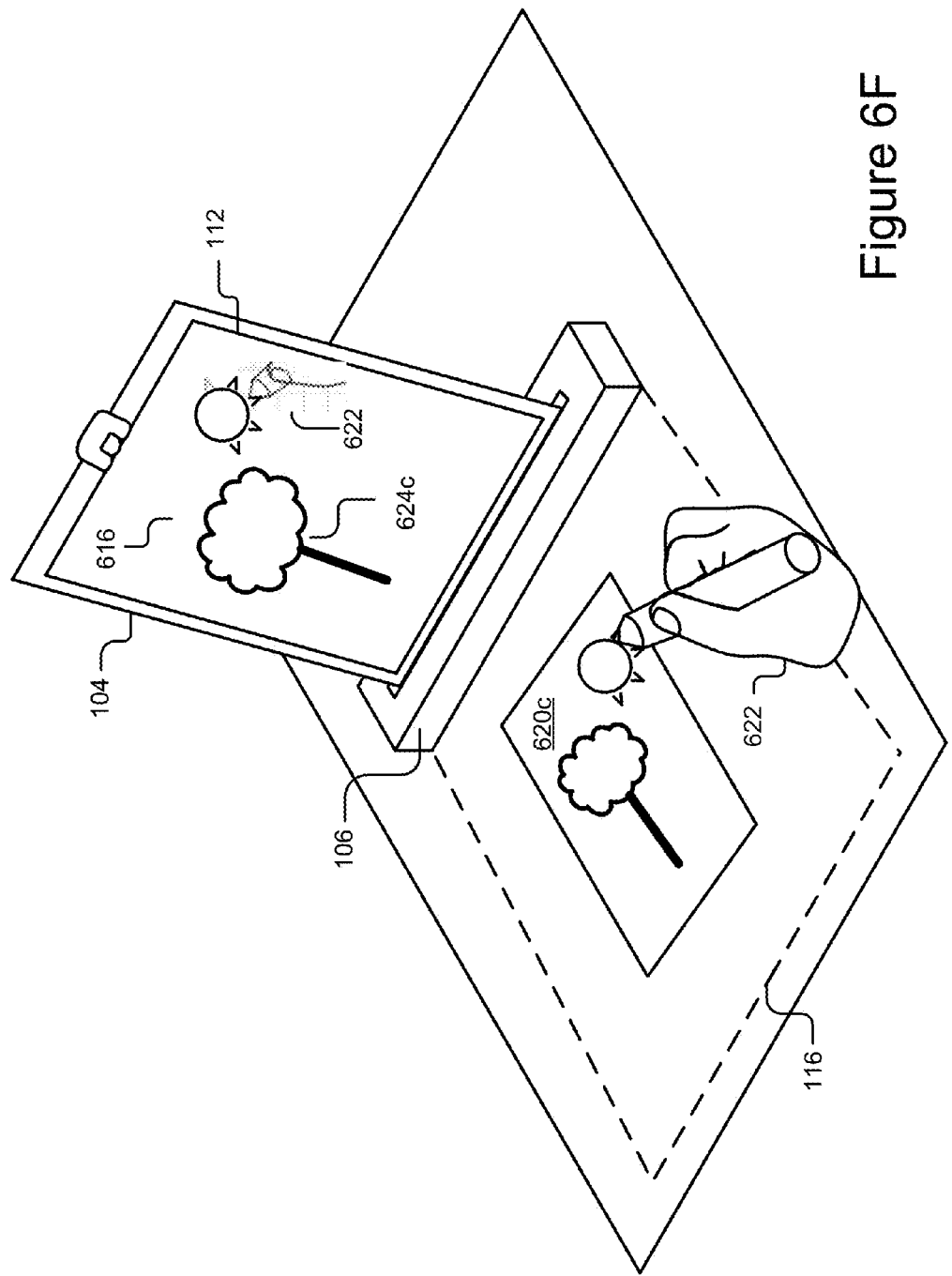

US 10,033,943 B1

ACTIVITY SURFACE DETECTION, DISPLAY AND ENHANCEMENT

CROSS-REFERENCE TO RELATED APPLICATIONS

The present application claims the benefit under 35 U.S.C. § 119(e) of U.S. Provisional Patent Application Ser. No. 62/090,345, titled "Optical Element for Activity Surface Monitoring and Activity Surface Detection, Display and Enhancement", filed on Dec. 10, 2014, the entire contents of which are incorporated herein by reference. The present application is also a continuation-in-part of U.S. patent application Ser. No. 14/842,777, titled "Virtualization of Tangible Interface Objects", filed Sep. 1, 2015, which is a continuation of U.S. patent application Ser. No. 13/928,111, titled "Virtualization of Tangible Interface Objects", filed on Jun. 26, 2013, now U.S. Pat. No. 9,158,389, which claims the benefit under 35 U.S.C. § 119(e) of U.S. Provisional Patent Application Ser. No. 61/714,138, titled "Platform Design for Adding Tangible User Interfaces to Mobile Applications", filed on Oct. 15, 2012, the entire contents of each of which are incorporated herein by reference.

BACKGROUND

The present disclosure relates to activity surface detection, display, and enhancement.

A tangible user interface is a physical environment that a user can physically interact with to manipulate digital information. While the tangible user interface has opened up a new range of possibilities for interacting with digital information, significant challenges remain when implementing such an interface. For instance, existing tangible user interfaces generally require expensive, high-quality sensors to digitize user interactions with this environment, which results in systems incorporating these tangible user interfaces being too expensive for most consumers. In addition, these existing systems are often difficult to setup and use, which has led to limited customer use and adoption.

SUMMARY

According to one innovative aspect of the subject matter in this disclosure, a method for monitoring user activity in a physical activity scene is described. The method includes determining, using a processor of a computing device, a traceable image and presenting the traceable image in an interface on a display of the computing device; capturing, using a video capture device coupled to the computing device, a video stream of a physical activity surface proximate to the computing device; displaying, on the display of the computing device, the captured video stream overlaid with the traceable image in the interface; processing, using the processor of the computing device, the video stream captured by the video capture device to detect a contour of a work being created by a user on the physical activity surface; comparing, using the processor of the computing device, the contour of the work with a corresponding portion of the traceable image; determining, using the processor of the computing device, an accuracy of the contour relative to the corresponding portion of the traceable image based on the comparison; determining, using the processor of the computing device, a progress of the user in creating a work on the physical activity surface based on the accuracy; and updating, using the processor of the computing device, the interface to include the progress of the user.

Generally another innovative aspect of the subject matter described in this disclosure may be embodied in methods that include determining, using a processor of a computing device, a traceable image and presenting the traceable image in an interface on a display of the computing device; capturing, using a video capture device coupled to the computing device, a video stream of a physical activity surface proximate to the computing device; and displaying, on the display of the computing device, the captured video stream overlaid with the traceable image in the interface.

Other implementations of one or more of these aspects and other aspects described in this document include corresponding systems, apparatus, and computer programs, configured to perform the actions of the methods, encoded on computer storage devices. The above and other implementations are advantageous in a number of respects as articulated through this document. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 6D-6G are graphical representation of an example platform for capturing an image of a physical object and guiding drawing of that object in a physical activity scene.

DETAILED DESCRIPTION

The technology described herein provides a platform for activity surface detection, display, and enhancement, such as providing guidance to user activity in a physical activity scene and tracking the progress of that activity. For example, the platform can provide drawing guidance to a user interested in drawing a picture using a writing utensil and a physical medium (e.g., paper) and track that user's progress.

In some implementations, the platform may augment a handheld computing device, such as a phone or tablet, with novel hardware accessories to make use of a built-in video camera on the computing device, and utilize novel computer vision algorithms to sense user interaction with the physical drawing, although numerous other implementations and configurations of the platform are contemplated and described herein.

This technology yields numerous advantages including, but not limited to, providing a low-cost alternative for developing a nearly limitless range of applications that blend both physical and digital mediums by reusing existing hardware (e.g., camera) and leveraging novel lightweight detection and recognition algorithms, having low implementation costs, being compatible with existing computing device hardware, operating in real-time to provide for a rich, real-time virtual experience, processing numerous (e.g., >15, >25, >35, etc.) physical drawings and/or physical drawing interactions simultaneously without overwhelming the computing device, recognizing physical drawings with substantially perfect recall and precision (e.g., 99% and 99.5%, respectively), being capable of adapting to lighting changes and wear and imperfections in a physical drawing, providing a collaborative tangible experience between users in disparate locations, being intuitive to setup and use even for young users (e.g., 3+ years old), being natural and intuitive to use, and requiring few or no constraints on the types of physical drawings that can be processed. For instance, in some implementations, no specialized markers or symbols are required to be included on the physical drawings in order for the platform to recognize the physical drawings.

Figure 1:
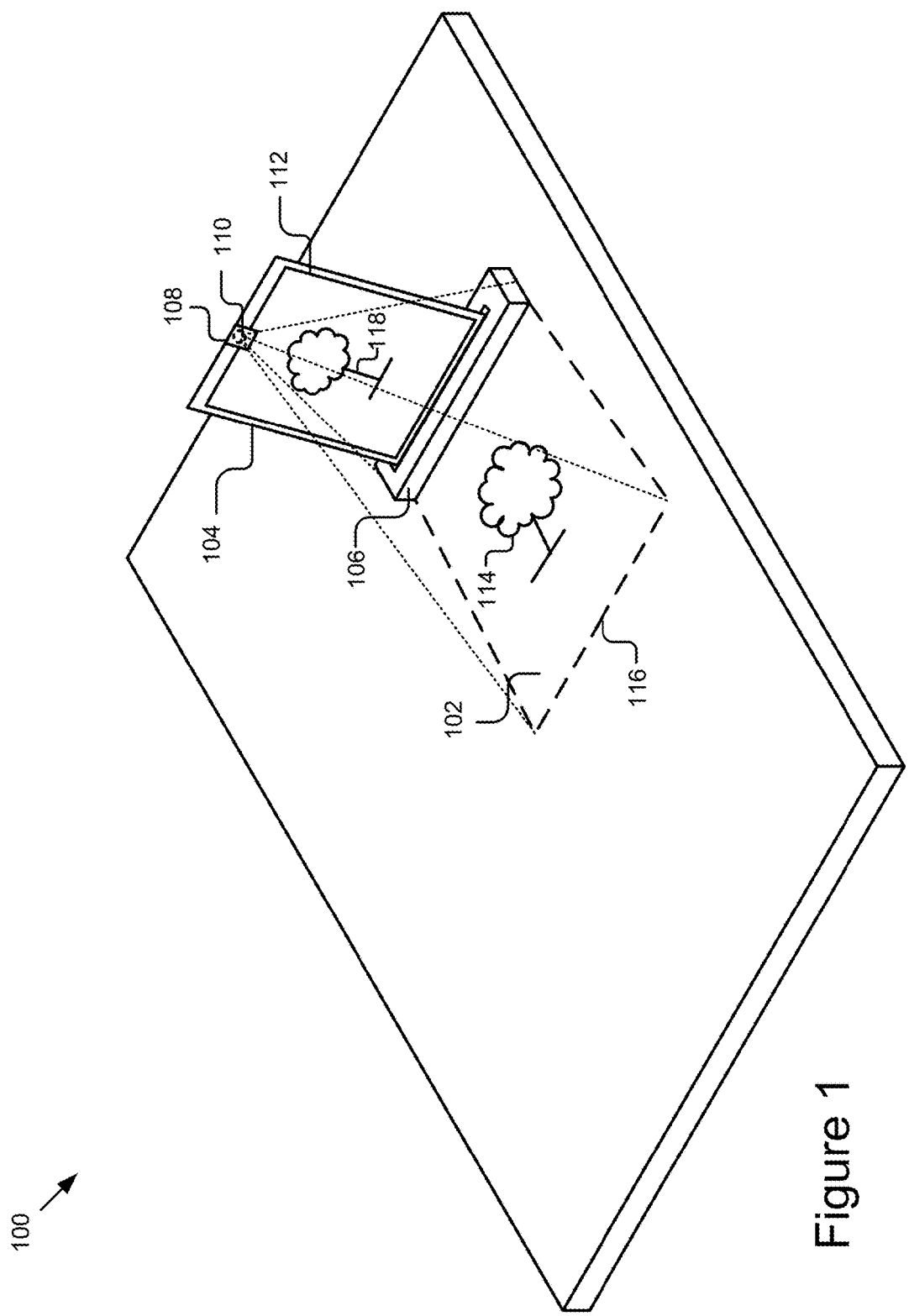
FIG. 1 is a block diagram illustrating an example configuration for activity surface detection, display, and enhancement.

FIG. 1 is a block diagram illustrating an example configuration 100 for activity surface detection, display, and enhancement. As depicted, the configuration 100 includes, in part, a tangible, physical activity surface 102 on which a physical work (e.g., drawing) 114 can be created and a computing device 104 that is equipped or otherwise coupled to a video capture device 110 configured to capture video of the activity surface 102. The computing device 104 includes novel software and/or hardware capable of processing the video to detect and/or recognize the tangible interface object (e.g., work 114), the manipulation of the work 114, etc., by one or more users, and provide for the virtualization of, visualization of, and interaction with of the work 114 (e.g., see virtualized object 118)).

While the activity surface 102 is depicted as substantially horizontal in FIG. 1, it should be understood that the activity surface 102 can be vertical or positioned at any other angle suitable to the user for interaction. The activity surface 102 can have any color, pattern, texture, and topography. For instance, the activity surface 102 can be substantially flat or be disjointed/discontinuous in nature. Non-limiting examples of an activity surface 102 include a table, desk, counter, ground, a wall, a whiteboard, a chalkboard, a customized surface, etc. The activity surface 102 may additionally or alternatively include a medium on which the user may render works, such as paper, canvas, fabric, clay, foam, or other suitable medium.

In some implementations, the activity surface 102 may be preconfigured for certain activities. As depicted in FIG. 1, an example configuration may include an activity surface 102 that includes an activity scene 116, such as a drawing area. The activity scene 116 may be integrated with the stand 106 or may be distinct from the stand 106 but placeable adjacent to the stand 106. The activity scene 116 can indicate to the user the boundaries of the activity surface 102 that is within the field of view of the video capture device 110. In some instances, the size of the interactive area on the activity scene 116 may be bounded by the field of view of the video capture device 110 and can be adapted by an adapter 108 and/or by adjusting the position of the video capture device 110. In additional examples, the activity scene 116 may be a light projection (e.g., pattern, context, shapes, etc.) projected onto the activity surface 102.

The computing device 104 included in the example configuration 100 may be situated on the surface 102 or otherwise proximate to the surface 102. The computing device 104 can provide the user(s) with a virtual portal for visualizing the work being created/manipulated by the user. For example, the computing device 104 may be placed on a table in front of a user so the user can easily see the computing device 104 while interacting with work 114 on the activity surface 102. Example computing devices 104 may include, but are not limited to, mobile phones (e.g., feature phones, smart phones, etc.), tablets, laptops, desktops, netbooks, TVs, set-top boxes, media streaming devices, portable media players, navigation devices, personal digital assistants, etc.

The computing device 104 includes or is otherwise coupled (e.g., via a wireless or wired connection) to a video capture device 110 (also referred to herein as a camera) for capturing a video stream of the activity surface 102. As depicted in FIG. 1 the video capture device 110 may be a front-facing camera that is equipped with an adapter 108 that adapts the field of view of the camera 110 to include, at least in part, the activity surface 102. For clarity, the activity scene of the activity surface 102 captured by the video capture device 110 is also interchangeably referred to herein as the activity surface or the drawings area in some implementations.

As depicted in FIG. 1, the computing device 104 and/or the video capture device 110 may be positioned and/or supported by a stand 106. For instance, the stand 106 may position the display 112 of the video capture device 110 in a position that is optimal for viewing and interaction by the user who is simultaneously interacting with the physical environment (drawing area 116). The stand 106 may be configured to rest on the activity surface 102 and receive and sturdily hold the computing device 104 so the computing device 104 remains still during use.

In some implementations, the adapter 108 adapts a video capture device 110 (e.g., front-facing, rear-facing camera) of the computing device 104 to capture substantially only the drawing area 116, although numerous further implementations are also possible and contemplated. For instance, the camera adapter 108 can split the field of view of the front-facing camera into two scenes. In this example with two scenes, the video capture device 110 captures a drawing area 116 that includes a portion of the activity surface 102 and is able to determine physical drawings in either portion of the drawing area 116. In another example, the camera adapter 108 can redirect a rear-facing camera of the computing device (not shown) toward a front-side of the computing device 104 to capture the activity scene 116 of the activity surface 102 located in front of the computing device 104. In some implementations, the adapter 108 can define one or more sides of the scene being captured (e.g., top, left, right, with bottom open).

The adapter 108 and stand 106 for a computing device 104 may include a slot for retaining (e.g., receiving, securing, gripping, etc.) an edge of the computing device 104 to cover at least a portion of the camera 110. The adapter 108 may include at least one optical element (e.g., a mirror) to direct the field of view of the camera 110 toward the activity surface 102. The computing device 104 may be placed in and received by a compatibly sized slot formed in a top side of the stand 106. The slot may extend at least partially downward into a main body of the stand 106 at angle so that when the computing device 104 is secured in the slot, it is angled back for convenient viewing and utilization by its user or users. The stand 106 may include a channel formed perpendicular to and intersecting with the slot 136. The channel may be configured to receive and secure the adapter 108 when not in use. For example, the adapter 108 may have a tapered shape that is compatible with and configured to be easily placeable in the channel of the stand 106. In some instances, the channel may magnetically secure the adapter 108 in place to prevent the adapter 108 from being easily jarred out of the channel. The stand 106 may be elongated along a horizontal axis to prevent the computing device 104 from tipping over when resting on a substantially horizontal activity surface (e.g., a table). The stand 106 may include channeling for a cable that plugs into the computing device 104. The cable may be configured to provide power to the computing device 104 and/or may serve as a communication link to other computing devices, such as a laptop or other personal computer.

In some implementations, the adapter 108 may include one or more optical elements, such as mirrors and/or lenses, to adapt the standard field of view of the video capture device 110. For instance, the adapter 108 may include one or more mirrors and lenses to redirect and/or modify the light being reflected from activity surface 102 into the video capture device 110. As an example, the adapter 108 may include a mirror angled to redirect the light reflected from the activity surface 102 in front of the computing device 104 into a front-facing camera of the computing device 104. As a further example, many wireless handheld devices include a front-facing camera with a fixed line of sight with respect to the display 112. The adapter 108 can be detachably connected to the device over the camera 110 to augment the line of sight of the camera 110 so it can capture the activity surface 102 (e.g., surface of a table). The mirrors and/or lenses in some embodiments can be polished or laser quality glass. In other examples, the mirrors and/or lenses may include a first surface that is a reflective element. The first surface can be a coating/thin film capable of redirecting light without having to pass through the glass of a mirror and/or lens. In an alternative example, a first surface of the mirrors and/or lenses may be a coating/thin film and a second surface may be a reflective element. In this example, the lights passes through the coating twice, however since the coating is extremely thin relative to the glass, the distortive effect is reduced in comparison to a conventional mirror. These examples reduces the distortive effect of a conventional mirror in a cost effective way.

In another example, the adapter 108 may include a series of optical elements (e.g., mirrors) that wrap light reflected off of the activity surface 102 located in front of the computing device 104 into a rear-facing camera of the computing device 104 so it can be captured. The adapter 108 could also adapt a portion of the field of view of the video capture device 110 (e.g., the front-facing camera) and leave a remaining portion of the field of view unaltered so that multiple scenes may be captured by the video capture device 110 as shown in FIG. 1. The adapter 108 could also include optical element(s) that are configured to provide different effects, such as enabling the video capture device 110 to capture a greater portion of the activity surface 102. For example, the adapter 108 may include a convex mirror that provides a fisheye effect to capture a larger portion of the activity surface 102 than would otherwise be capturable by a standard configuration of the video capture device 110.

In some implementations, the video capture device is configured to include the stand 106 within its field of view. The stand 106 may serve as a reference point for performing geometric and/or image calibration of the camera 110. For instance, during calibration, the calibrator 302 (e.g., see FIG. 3) may calibrate the camera 110 (e.g., adjust the white balance, focus, exposure, etc.) of the camera 110 using the stand 106.

The video capture device 110 could, in some implementations, be an independent unit that is distinct from the computing device 104 and may be positionable to capture the activity surface 102 or may be adapted by the adapter 108 to capture the activity surface 102 as discussed above. In these implementations, the video capture device 110 may be communicatively coupled via a wired or wireless connection to the computing device 104 to provide it with the video stream being captured.

Figure 2:
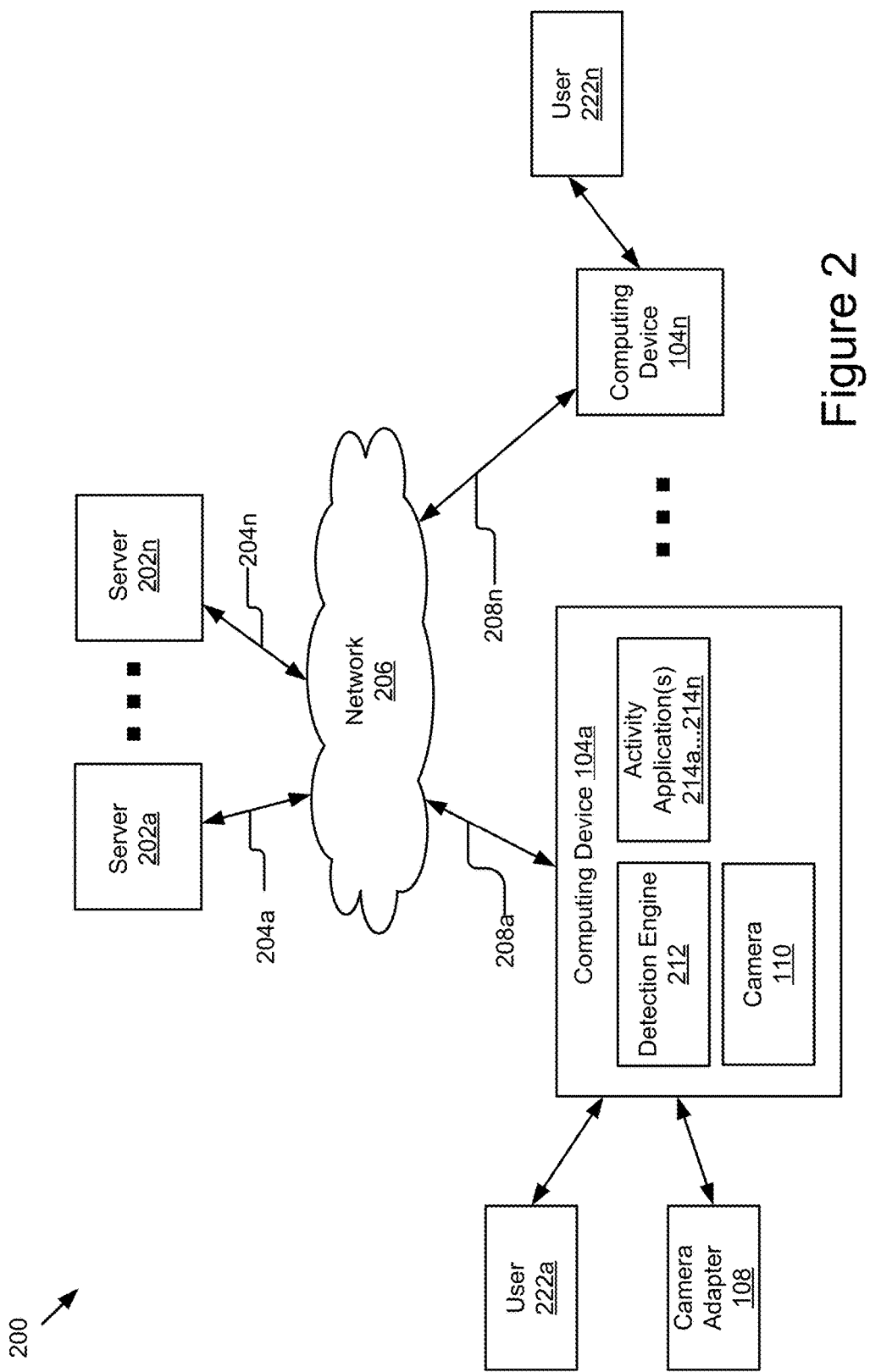
FIG. 2 is a block diagram illustrating an example computer system for activity surface detection, display, and enhancement.

FIG. 2 is a block diagram illustrating an example computer system 200 for virtualizing physical drawings. The illustrated system 200 includes computing devices 104a . . . 104n (also referred to individually and collectively as 104) and servers 202a . . . 202n (also referred to individually and collectively as 202), which are communicatively coupled via a network 206 for interaction with one another. For example, the computing devices 104a . . . 104n may be respectively coupled to the network 206 via signal lines 208a . . . 208n and may be accessed by users 222a . . . 222n (also referred to individually and collectively as 222). The servers 202a . . . 202n may be coupled to the network 206 via signal lines 204a . . . 204n, respectively. The use of the nomenclature "a" and "n" in the reference numbers indicates that any number of those elements having that nomenclature may be included in the system 200.

The network 206 may include any number of networks and/or network types. For example, the network 206 may include, but is not limited to, one or more local area networks (LANs), wide area networks (WANs) (e.g., the Internet), virtual private networks (VPNs), mobile (cellular) networks, wireless wide area network (WWANs), WiMAX® networks, Bluetooth® communication networks, peer-to-peer networks, other interconnected data paths across which multiple devices may communicate, various combinations thereof, etc.

The computing devices 104a . . . 104n (also referred to individually and collectively as 104) are computing devices having data processing and communication capabilities. For instance, a computing device 104 may include a processor (e.g., virtual, physical, etc.), a memory, a power source, a network interface, and/or other software and/or hardware components, such as front and/or rear facing cameras, display, graphics processor, wireless transceivers, keyboard, camera, sensors, firmware, operating systems, drivers, various physical connection interfaces (e.g., USB, HDMI, etc.). The computing devices 104a . . . 104n may couple to and communicate with one another and the other entities of the system 200 via the network 206 using a wireless and/or wired connection. While two or more computing devices 104 are depicted in FIG. 2, the system 200 may include any number of computing devices 104. In addition, the computing devices 104a . . . 104n may be the same or different types of computing devices.

As depicted in FIG. 2, one or more of the computing devices 104a . . . 104n may include a camera 110, a detection engine 212, and one or more activity applications 214a . . .

214n (also referred to individually and collectively as 214). One or more of the computing devices 104 and/or cameras 110 may also be equipped with an adapter 108 as discussed elsewhere herein. The detection engine 212 is capable of detecting and recognizing physical drawings located in the activity scene 116 (on the activity surface 102 within field of view of camera 110). The detection engine 212 can detect the position and orientation of the physical drawing in physical space, detect how the physical drawings are being manipulated by the user, and cooperate with the activity application(s) 214 to provide users with a rich virtual experience incorporating those physical drawings and their manipulation. In some implementations, the detection engine 212 processes video captured by a camera 110 to detect and recognize the physical drawing(s) and their attributes, generate events based on the physical drawing(s) and their attributes, and provide the events generated for the physical drawing(s) to one or more activity applications 214. The activity application(s) 214 are capable of processing the events received from the detection engine 212 to provide the rich environment that blends the physical drawing created by the user with information related to and/or complementing the physical drawing. Additional structure and functionality of the computing devices 104 are described in further detail below with reference to at least FIG. 3.

The servers 202 may each include one or more computing devices having data processing, storing, and communication capabilities. For example, the servers 202 may include one or more hardware servers, server arrays, storage devices and/or systems, etc., and/or may be centralized or distributed/cloud-based. In some implementations, the servers 202 may include one or more virtual servers, which operate in a host server environment and access the physical hardware of the host server including, for example, a processor, memory, storage, network interfaces, etc., via an abstraction layer (e.g., a virtual machine manager).

The servers 202 may include software applications operable by one or more computer processors of the servers 202 to provide various computing functionalities, services, and/or resources, and to send data to and receive data from the computing devices 104. For example, the software applications may provide functionality for internet searching; social networking; web-based email; blogging; micro-blogging; photo management; video, music and multimedia hosting, distribution, and sharing; business services; news and media distribution; user account management; or any combination of the foregoing services. It should be understood that the servers 202 are not limited to providing the above-noted services and may include other network-accessible services.

In some implementations, a server 202 may include a search engine for retrieving results from a data store that match one or more search criteria. In some instances, the search criteria may include an image and the search engine may compare the image to images of products stored in its data store (not shown) to identify a product that matches the image. In a further example, the detection engine 212 and/or the storage 310 (e.g., see FIG. 3) may signal the search engine to provide information that matches a physical drawing, object, and/or image that it has extracted from a video stream.

It should be understood that the system 200 illustrated in FIG. 2 is provided by way of example, and that a variety of different system environments and configurations are contemplated and are within the scope of the present disclosure. For instance, various functionality may be moved from a server to a client, or vice versa and some implementations may include additional or fewer computing devices, services, and/or networks, and may implement various functionality client or server-side. Further, various entities of the system 200 may be integrated into to a single computing device or system or additional computing devices or systems, etc.

Figure 3:
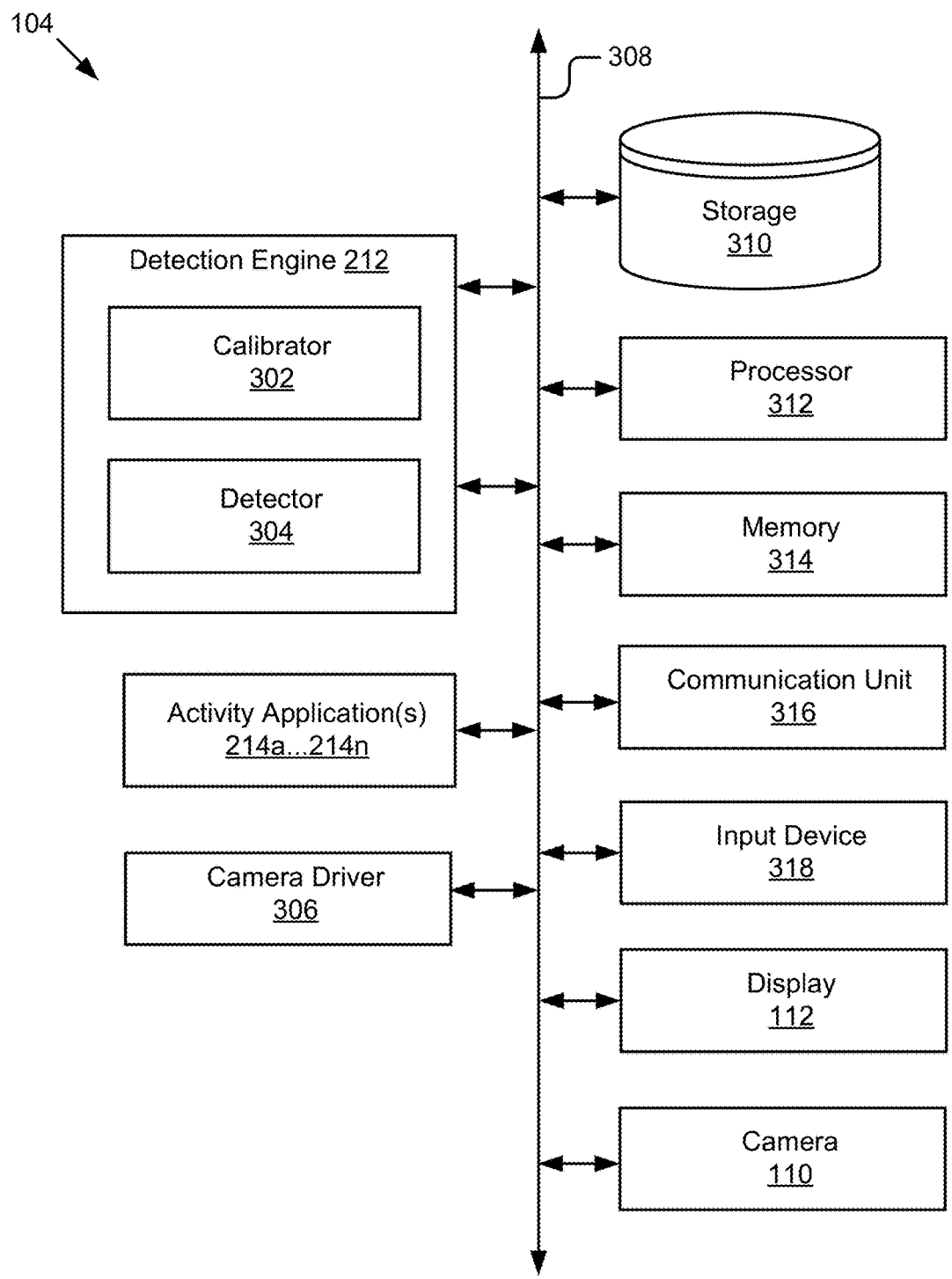
FIG. 3 is a block diagram illustrating an example computing device.

FIG. 3 is a block diagram of an example computing device 104. As depicted, the computing device 104 may include a processor 312, memory 314, communication unit 316, display 112, camera 110, and an input device 318, which are communicatively coupled by a communications bus 308. However, it should be understood that the computing device 104 is not limited to such and may include other elements, including, for example, those discussed with reference to the computing devices 104 in FIGS. 1 and 2.

The processor 312 may execute software instructions by performing various input/output, logical, and/or mathematical operations. The processor 312 have various computing architectures to process data signals including, for example, a complex instruction set computer (CISC) architecture, a reduced instruction set computer (RISC) architecture, and/or an architecture implementing a combination of instruction sets. The processor 312 may be physical and/or virtual, and may include a single core or plurality of processing units and/or cores.

The memory 314 is a non-transitory computer-readable medium that is configured to store and provide access to data to the other components of the computing device 104. In some implementations, the memory 314 may store instructions and/or data that may be executed by the processor 312. For example, the memory 314 may store the detection engine 212, the activity applications 214a . . . 214n, and the camera driver 306. The memory 314 is also capable of storing other instructions and data, including, for example, an operating system, hardware drivers, other software applications, data, etc. The memory 314 may be coupled to the bus 308 for communication with the processor 312 and the other components of the computing device 104.

The communication unit 316 may include one or more interface devices (I/F) for wired and/or wireless connectivity with the network 206 and/or other devices. In some implementations, the communication unit 316 may include transceivers for sending and receiving wireless signals. For instance, the communication unit 316 may include radio transceivers for communication with the network 206 and for communication with nearby devices using close-proximity (e.g., Bluetooth®, NFC, etc.) connectivity. In some implementations, the communication unit 316 may include ports for wired connectivity with other devices. For example, the communication unit 316 may include a CAT-5 interface, Thunderbolt™ interface, FireWire™ interface, USB interface, etc.

The display 112 may display electronic images and data output by the computing device 104 for presentation to a user 222. The display 112 may include any conventional display device, monitor or screen, including, for example, an organic light-emitting diode (OLED) display, a liquid crystal display (LCD), etc. In some implementations, the display 112 may be a touch-screen display capable of receiving input from one or more fingers of a user 222. For example, the display 112 may be a capacitive touch-screen display capable of detecting and interpreting multiple points of contact with the display surface. In some implementations, the computing device 104 may include a graphics adapter (not shown) for rendering and outputting the images and data for presentation on display 112. The graphics adapter (not shown) may be a separate processing device including a separate processor and memory (not shown) or may be integrated with the processor 312 and memory 314.

The input device 318 may include any device for inputting information into the computing device 104. In some implementations, the input device 318 may include one or more peripheral devices. For example, the input device 318 may include a keyboard (e.g., a QWERTY keyboard), a pointing device (e.g., a mouse or touchpad), microphone, a camera, etc. In some implementations, the input device 318 may include a touch-screen display capable of receiving input from the one or more fingers of the user 222. For instance, the functionality of the input device 318 and the display 112 may be integrated, and a user 222 of the computing device 104 may interact with the computing device 104 by contacting a surface of the display 112 using one or more fingers. In this example, the user 222 could interact with an emulated (i.e., virtual or soft) keyboard displayed on the touch-screen display 112 by using fingers to contacting the display 112 in the keyboard regions.

The detection engine 212 may include a calibrator 302 and a detector 304. The components 212, 302, and 304 may be communicatively coupled by the bus 308 and/or the processor 312 to one another and/or the other components 214, 306, 310, 314, 316, 318, 112, and/or 110 of the computing device 104. In some implementations, one or more of the components 212, 302, and 304 are sets of instructions executable by the processor 312 to provide their functionality. In some implementations, one or more of the components 212, 302, and 304 are stored in the memory 314 of the computing device 104 and are accessible and executable by the processor 312 to provide their functionality. In any of the foregoing implementations, these components 212, 302, and 304 may be adapted for cooperation and communication with the processor 312 and other components of the computing device 104.

The calibrator 302 includes software and/or logic for performing geometric and image calibration of the camera 110. Geometric calibration includes calibrating the camera 110 to account for the geometry of the platform/video capturing setup (e.g., see FIGS. 1A-1C). For instance, geometric calibration configures the camera 110 to account for the height of the stand 106, angle the camera 110 and/or computing device 104 are positioned at, and/or the characteristics (e.g., size, angle, topography, etc.) of the activity surface 102 and/or board 120, any optical effects induced by the adapter 108 and/or optics of the camera 110, etc. Performing geometric calibration optimizes the images being captured by the camera 110 for physical drawing detection by the detector 304, as discussed in further detail below. Geometric calibration is advantageous as it calibrates camera 110 to account for discontinuities and/or non-uniformities in activity surface 102, thus allowing the technology described herein to be used in a variety of different settings and with a wide variety of activity surface configurations (e.g., bumpy surfaces, whiteboards, tables, beds, etc.). In some implementations, the calibrator 302 can calibrate the camera 110 to optimize it to capture a split field of view that contains both the user in one portion and the activity surface 102 in another portion.

Image calibration includes manipulating the camera 110 to optimize image recognition by the detector 304. In some implementations, the calibrator 302 performs image calibration by verifying and/or adjusting one or more parameters, such as focus, exposure, white balance, aperture, f-stop, image compression, ISO, depth of field, noise reduction, focal length, etc., of the camera 110 to optimize the images of the physical drawings being captured by the camera 110 for image recognition, as discussed in further detail below.

The detector 304 includes software and/or logic for processing the video stream captured by the camera 110 to detect and identify line segments related to a physical drawing included in the activity scene 116. In some implementations, the detector 304 may be coupled to and receive the video stream from the camera 110, the camera driver 306, and/or the memory 314. In some implementations, the detector 304 may process the images of the video stream to determine positional information for the line segments related to the physical drawing in the activity scene 116 (e.g., location and/or orientation of the line segments in 2D or 3D space) and then analyze characteristics of the line segments included in the video stream to determine the identities and/or additional attributes of the line segments.

The detector 304 may expose the line segments related to the physical drawing and their attributes to the activity applications 214. For instance, the detector 304 may generate events for the line segments based on the information determined by the detector 304 for the line segments, and may pass the events to the to one or more activity applications 214 for use thereby in generating rich virtual environments incorporating the physical drawings. The detector 304 may be coupled to the applications 214 (e.g., via the processor 312 and/or the bus 308) to provide the events to the applications 214.

The detector 304 may be coupled to the calibrator 302 to signal it to perform geometric and/or image calibration. In some implementations, the detector 304 may determine whether to signal the calibrator 302 to calibrate the camera 110 based at least in part on whether line segments and/or physical drawings are being successfully detected.

The detector 304 may be coupled to the storage 310 via the bus 308 store, retrieve, and otherwise manipulate data stored therein. For example, the detector 304 may query the storage 310 for data matching any line segments that it has determined are present in the activity scene 116.

The activity applications 214a . . . 214n include software and/or logic for receiving object-related events and running routines based thereon to generate a virtual environment for presentation to the user that incorporates, in real-time, the virtualization of the physical objects (e.g., the work 114) in the physical activity scene 116. The activity applications 214a . . . 214n may be coupled to the detector 304 via the processor 312 and/or the bus 308 to receive the events. In some implementations, the activity applications 214a . . . 214 may process the events received from the detector 304 to determine the attributes of the object, such as the contours of the work (e.g., the lines being drawn) and may render corresponding information for display based on the attributes.

The activity application 214 may enhance the virtual information/environment it generates using supplemental information determined based on the physical drawing 114 present in the activity scene 116. For example, an activity application 214 may provide visual indicators reflecting the user's progress in creating the work based on a virtual representation depicted on the screen. In further examples, the activity application 214 can develop a virtualized representation of a physical drawing 114 that distorts or alters the physical drawing 114 to display an interaction with the virtualization. Other variations are also possible and contemplated.

Non-limiting examples of the activity applications 214 may include video games, learning applications, assistive applications, storyboard applications, collaborative applications, productivity applications, etc. Various non-limiting examples of the virtual environments that can be rendered by the activity applications 214 are discussed below with reference to at least FIGS. 6-9.

The camera driver 306 includes software storable in the memory 314 and operable by the processor 312 to control/operate the camera 110. For example, the camera driver 306 is a software driver executable by the processor 312 for signaling the camera 110 to capture and provide a video stream and/or still image, etc. The camera driver 306 is capable of controlling various features of the camera 110 (e.g., flash, aperture, exposure, focal length, etc.). The camera driver 306 may be communicatively coupled to the camera 110 and the other components of the computing device 104 via the bus 308, and these components may interface with the camera driver 306 via the bus 308 to capture video and/or still images using the camera 110.

As discussed elsewhere herein, the camera 110 is a video capture device configured to capture video of at least the activity surface 102. The camera 110 may be coupled to the bus 308 for communication and interaction with the other components of the computing device 104. The camera 110 may include a lens for gathering and focusing light, a photo sensor including pixel regions for capturing the focused light and a processor for generating image data based on signals provided by the pixel regions. The photo sensor may be any type of photo sensor including a charge-coupled device (CCD), a complementary metal-oxide-semiconductor (CMOS) sensor, a hybrid CCD/CMOS device, etc. The camera 110 may also include any conventional features such as a flash, a zoom lens, etc. The camera 110 may include a microphone (not shown) for capturing sound or may be coupled to a microphone included in another component of the computing device 104 and/or coupled directly to the bus 308. In some embodiments, the processor of the camera 110 may be coupled via the bus 308 to store video and/or still image data in the memory 314 and/or provide the video and/or still image data to other components of the computing device 104, such as the detection engine 212 and/or activity applications 214.

The storage 310 is an information source for storing and providing access to stored data, such as the virtualized works created by the user, gallery(ies) of images that may be displayed on the display 112, user profile information, works-in-progress (e.g., state information, virtual images of the works and graphical representations of the user's reproductions), etc., object data, calibration data, and/or any other information generated, stored, and/or retrieved by the activity application(s) 214.

In some implementations, the storage 310 may be included in the memory 314 or another storage device coupled to the bus 308. In some implementations, the storage 310 may be or included in a distributed data store, such as a cloud-based computing and/or data storage system. In some implementations, the storage 310 may include a database management system (DBMS). For example, the DBMS could be a structured query language (SQL) DBMS. For instance, storage 310 may store data in an object-based data store or multi-dimensional tables comprised of rows and columns, and may manipulate, i.e., insert, query, update, and/or delete, data entries stored in the verification data store 106 using programmatic operations (e.g., SQL queries and statements or a similar database manipulation library). Additional characteristics, structure, acts, and functionality of the storage 310 is discussed elsewhere herein.

Figure 4:
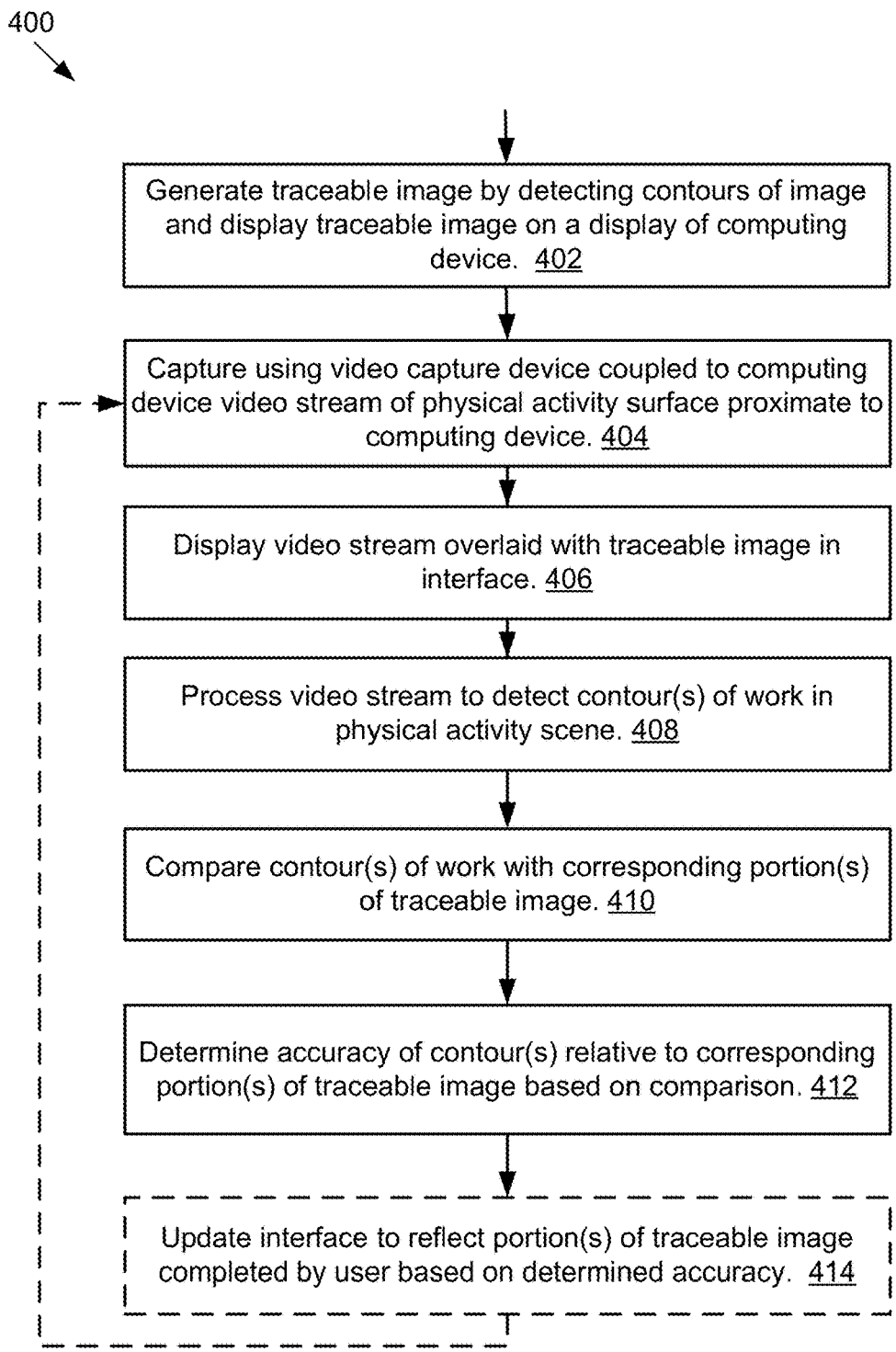
FIG. 4 is a flowchart of an example method for activity surface detection, display, and enhancement.

FIG. 4 is a flowchart of an example method 400 for activity surface detection, display, and enhancement. In block 402, the activity application 214 generates and presents a traceable image in an interface on a display of the computing device for a user to interact with while working in the physical activity scene. In an implementation where the user has captured or otherwise selected a new image, such as a photograph for which the activity application has not yet generated a traceable version, the activity application 214 detects contours in the image (e.g., using an available contour/edge detection algorithm), generates a traceable image (e.g., based on the output of the algorithm), and displays the traceable image on a display 112 of the computing device 104, as is discussed further below with reference to at least FIG. 6C.

In block 404, a video capture device 110 coupled to the computing device 104 captures a video stream of a physical activity surface 102 proximate to the computing device 104, as discussed further below with reference to at least FIG. 6D. In block 406, the activity application 214 displays the captured video stream overlaid with the traceable image in the interface. This is advantageous as the user can visualize a realtime comparison between his/her activities in the physical activity scene (as reflected by the video stream) and use the visualization to reproduce the image in the activity scene of the physical activity surface 102. By way of further example, if the user is reproducing the image displayed by the activity application 214 by drawing it using a drawing utensil and paper placed in the activity scene, then the user can use the video feedback (of the user's hands, positioning of the drawing utensil, etc.) and the relative position of the image displayed by the activity application 214 to determine where and how to draw the different portions of the image so the user can reproduce an accurate representation of the selected image.

In some implementations, at the outset, the activity application 214 may detect a user input(s) instructing the activity application 214 to resize and/or reposition the instructional image within the interface of the display. For example, the user may wish to zoom into a particular aspect of the image and/or position the image in a particular location on the display. Responsive to receiving the user input(s), the activity application processes the user input to determine a zoom amount and/or a pan position and resizes and/or relocates the image based on the zoom amount and/or pan position. As a further example, the user using a touch sensitive screen may input a pinch gesture to zoom the image in or out, and/or a swiping gesture to reposition the image. The activity application 214 may receive data from the touch-sensitive screen (e.g., the digitizer) parameterizing the user input(s) (e.g., via the operating system of the computing device) and resize and/or reposition the image based on the data. Using the visual feedback provided by the overlaying of the video of the physical activity scene with the virtual scene, the user then uses the instructional image to reproduce a physical version of it in the physical activity scene.

In some implementations, the method 400 may continue by processing the objects in the video stream to determine the user's progress. For instance, in block 408, the detection engine 212 processes the video stream captured by the video capture device 110 to detect the contours of the object(s) present in the stream. For example, the detection engine 212 detects the contours of the work being created by the user on the physical activity surface. As a further example, the detection engine 212 can detect a line drawn by the user and a position of a drawing utensil present in the physical activity surface.

In block 410, the detection engine 212 compares the contour(s) of the work with the corresponding portion(s) of the traceable image. In doing so, the detection engine 212 can correlate the positions of the pixels of the contour(s) from the image frames with the traceable image. The detection engine 212 can then determine the accuracy of the contour(s) relative to the corresponding portion(s) of the traceable image based on the comparison, as shown in block 412. For example, the degree to which the pixels of the contour(s) overlay with the pixels of the portions of the traceable image may be used to generate an accuracy/confidence value, which can be compared to a threshold or a scale to determine whether, or how well, the user is reproducing the object(s) depicted by the traceable image.

In block 414, the activity application 214 updates the interface to reflect the user's progress. For instance, the activity application 214 may update the interface to reflect the portion(s) of the traceable image completed by the user based on the determined accuracy and/or may update a user's score based on how well the virtual image is being drawn in the physical activity scene by the user. Other variations are also possible and contemplated.

In some implementations, the detection engine 212 can execute object detection algorithm tuned to identify the user's hand, art utensil, or other similar object in the video stream and separate it from the virtual work constructed by the detection engine 212. The activity application 214 can then use the object attributes of the hand, utensils, etc., to suppress them from the work being created by the user (so as not to obfuscate the work, the user's progress, and/or the score with unwanted objects/information).

The various operations in the method 400 may repeat as necessary. For example, the blocks 404-414 may be executed upon each refresh cycle of the video capture device, at a predefined framerate, at a specific time interval, or other suitable cycle. In some instances, the detection engine is configured to detect changes in the state of the activity surface and trigger the next cycle. For example, the detector 304 may receive a video image frame of the activity scene 116, compare the activity scene image to a previously received image frame of the activity scene 116, determine whether a substantial difference exists between the image frame of the activity scene 116 and the previously received image frame of the activity scene 116, and proceed to process as described above with respect to blocks 404 and 406, and in some cases 408-414, if the substantial difference is determined to exist. If a substantial difference is not detected between the current and previous states of the activity scene 116, the method 400 may wait for the next image frame and again perform the above-described difference assessment. This allows the detection engine 212 to wait for the next video image that actually contains a significant enough change to justify processing the image. As a further example, during each cycle, the detector 304 may compare a previous and subsequent video image to determine if there are any significant changes and may refrain from processing the most recent image unless the changes satisfy a predetermined threshold. The above change detection method is advantageous because it can eliminate unnecessary detection and recognition processing by the platform and thereby avoid bogging down/adversely affecting the performance of the computing device 104.

Figure 5:
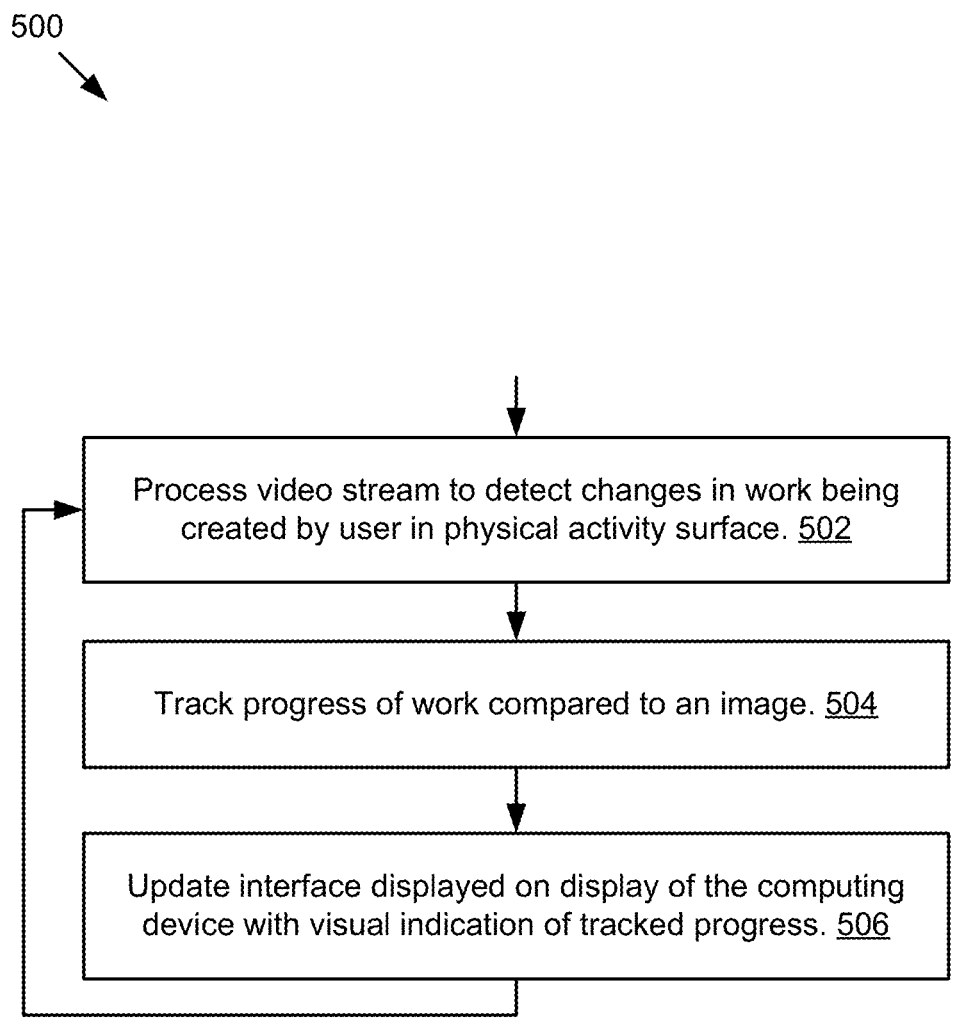
FIG. 5 is a flowchart of an example method for tracking incremental progress of user activity in a physical activity scene.

FIG. 5 is a flowchart of an example method 500 for tracking incremental progress of user activity in a physical activity scene. In block 502, the detection engine 214 processes the video stream to detect changes in the work being created by the user in the physical activity surface 102. In some embodiments, the detection engine 212 executed by the computing device 104 detects any new contour(s) in a just-captured video frame relative to previously captured video frame(s).

In block 504, the computing device 104, tracks the progress of the work in comparison to the instructional image by evaluating which portion(s) of the instructional image depicted on the display the changes relate. For example, as discussed above with respect to the method 400, the method 500 compares the contour(s) to corresponding portions/contour(s) of the instructional image to determine whether those portions were successfully completed (and/or the degree to which they were successfully completed) by satisfying an accuracy/confidence threshold.

In block 506, the activity application 214 updates the interface displayed on the display 112 with a visual indication of the tracked progress. For example, if the user is drawing a reproduce of the object(s) depicted by the instructional image, or modeling the object(s) using a modeling medium, etc., the activity application 214 can generate and display a visual indication of the portion of the object(s) just completed (e.g., highlight lines just drawn, areas just modeled, etc.) to provide the user feedback on the progress the user just made and guide the user along his/her path to completion.

As with the operation(s) of the method 400, the operation(s) of the method 500 may be iteratively executed as the user creates the work in the physical activity scene. Additionally, the operation(s) of the method 500 may be executed in conjunction with the operations of the other methods discussed herein, such as the method 400. Further, it should be understood that the methods 400 and 500 are in many respects compatible with, and in some cases expansions of, one or more of the other methods, and that further methods are possible and contemplated based on the combination of various aspects of these methods.

The methods 400 and 500 are advantageous in a number of respects including, but not limited to, providing fast and accurate physical drawing detection and recognition, providing the user with a real-time, virtualized experience that blends the user's physical drawings into rich, visual and computational enhancements that would otherwise be inaccessible to the user, and adding a meaningful tangible aspect to what can otherwise be a tactile-less, largely sterile digital experience.

Figure 6A:
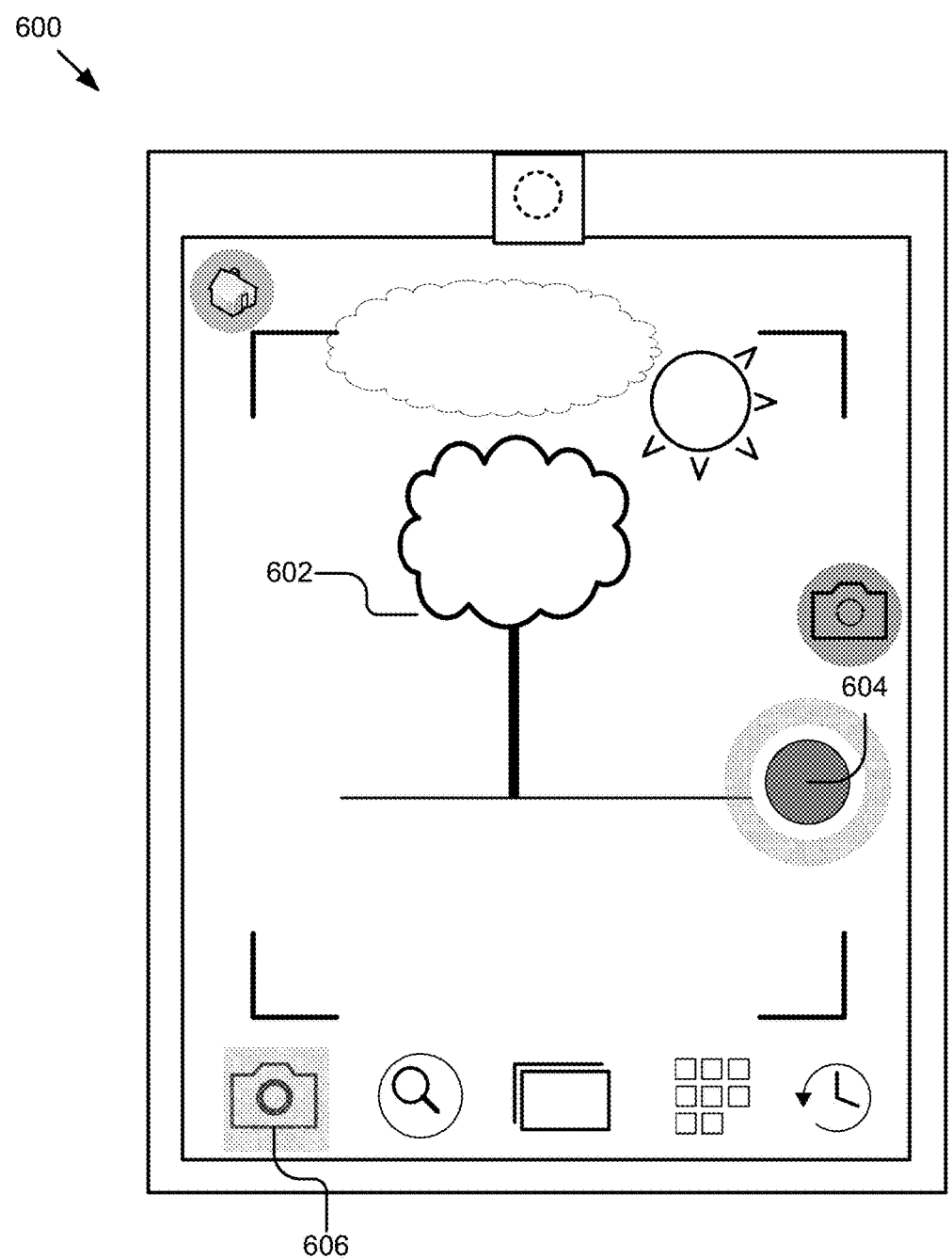
FIGS. 6A-6C are graphical representations of an example user interface including virtualized drawing.

FIGS. 6A-6H are examples of creating a virtualization of a physical drawing. In FIG. 6A, a user may be presented with an example user interface 600 that may be used to capture an image. The video capture device 110 or an alternative camera coupled to computing device 104 may be used to capture a scene for visualization. A scene 602 captureable by the video capture device 110 or an alternative camera, may be displayed in the user interface 600 on the display 112. A menu including different options may be displayed along the bottom of the user interface 600. In this example, the camera tool/option 606 is highlighted responsive to user selection. The interface allows the user to capture digital images of surrounding object(s) or environment(s), such as that depicted in the scene 602. The interface 600 includes a capture button 604 that is user-selectable to trigger the video capture device 110 to capture and provide an image of the scene 602.

Figure 6B:
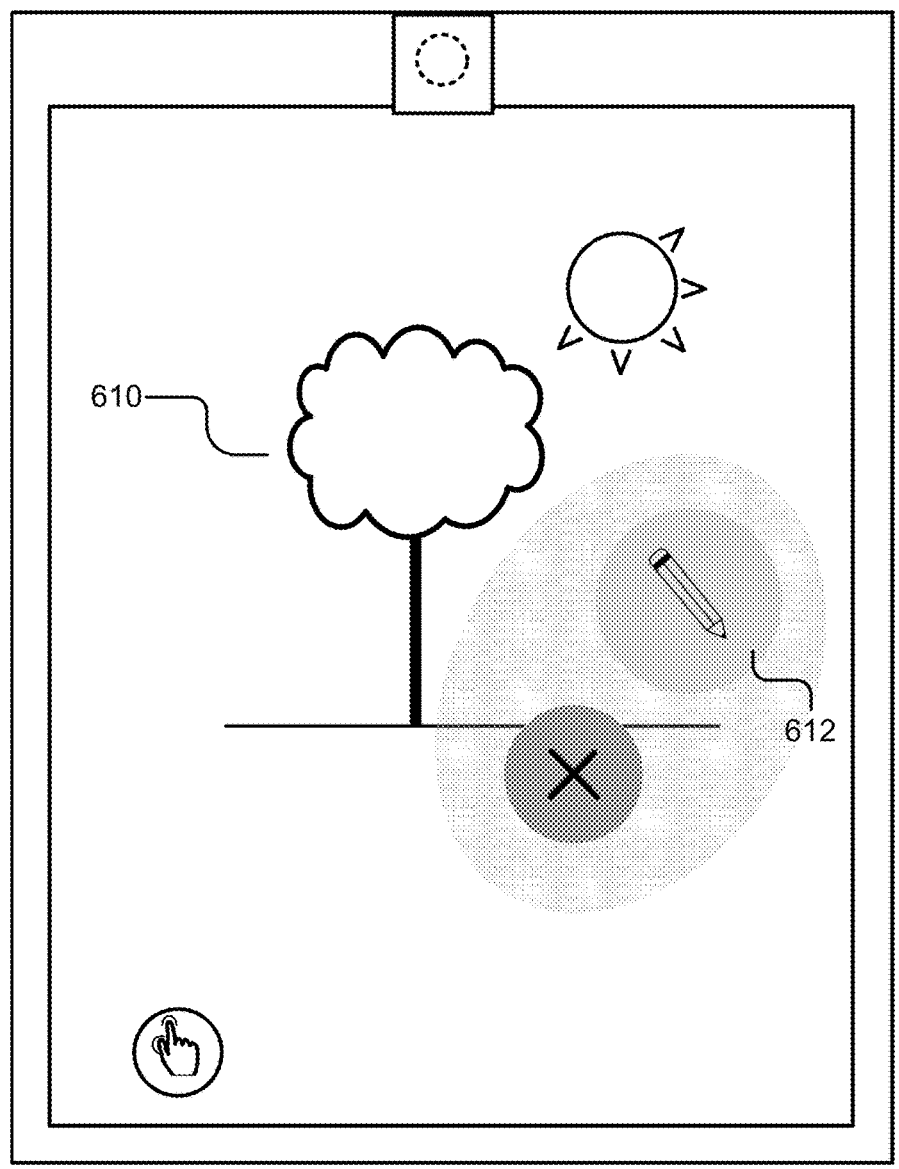

Responsive to the capture of the image, the activity application 214 can generate and display the user interface 608 depicted in FIG. 6B which displays the image 610 of the scene 602 captured using the interface 600 in FIG. 6A. The user interface 608 may provide the user with options to edit the captured image, such as the pencil button 612. The user may select the button 612 to convert the image 610 into an instructional/traceable image.

Figure 6C:
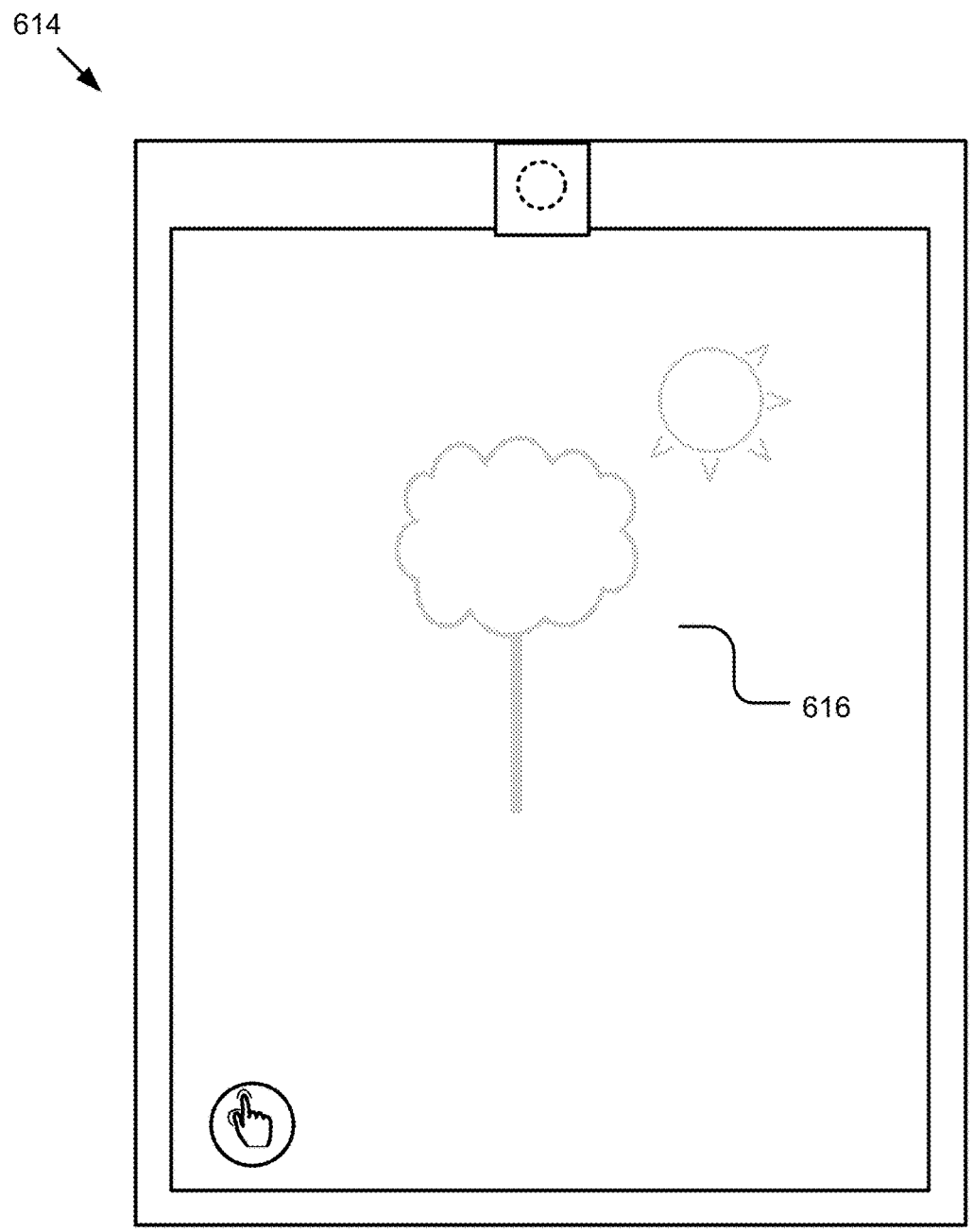

In FIG. 6C, the user interface 614 includes the traceable/instructional image 616 generated from the image 610 depicted in FIG. 6B. In this example, the user utilized the activity application 214 to capture a picture of a surrounding environment, and upon capturing the image using the video capture device 110, the activity application 214 (e.g., in conjunction with the detection engine 214) processed the image 610 to detect contours of the image 610 and render a traceable image 616 based on the detected contours.

In some embodiments, the number of lines displayed in the traceable image 616 may be user-configured and/or adjusted. For instance, the user may use the lines slider to reduce the number of contour lines displayed in traceable image 616. The activity application 214 can exclude/reduce aspects from the traceable image 616 using on standard filtering and/or image processing methods. The user may additionally and/or alternatively select from different filtering methods used to render the contours (e.g., increase/reduce aggressiveness of contours, increase/reduce number of contour lines, reduce/increase thickness of contour lines, etc.). In some embodiments, the traceable image 616 may be semi-transparent and may be overlaid with the original image so the user can compare it to the original image in real-time as adjustments are made to adjust the contours, contrast, brightness, sharpness, and/or other parameters of the image.

In the example embodiment, the image 608 includes a cloud, sun and tree in FIG. 6B. During the creation process, the user may adjust the parameters of the contouring to eliminate unwanted aspects and/or artifacts, and/or produce a simpler or more complex template image. For example, as shown, the user may adjust the instructional image so that it excludes the cloud but preserves the tree and the sun.

The user may also be able to move and/or resize the traceable image 616. In some embodiments, the traceable image 616 is displayed overlaid upon the image 610 and the user is able to move and/or resize the traceable image 616 while the image 616 is overlaid on the image 610. An example of this feature is displayed in FIG. 7C, where the traceable image 714 is overlaid on the image 704 of the scissors in the same screen.

Figure 6D:
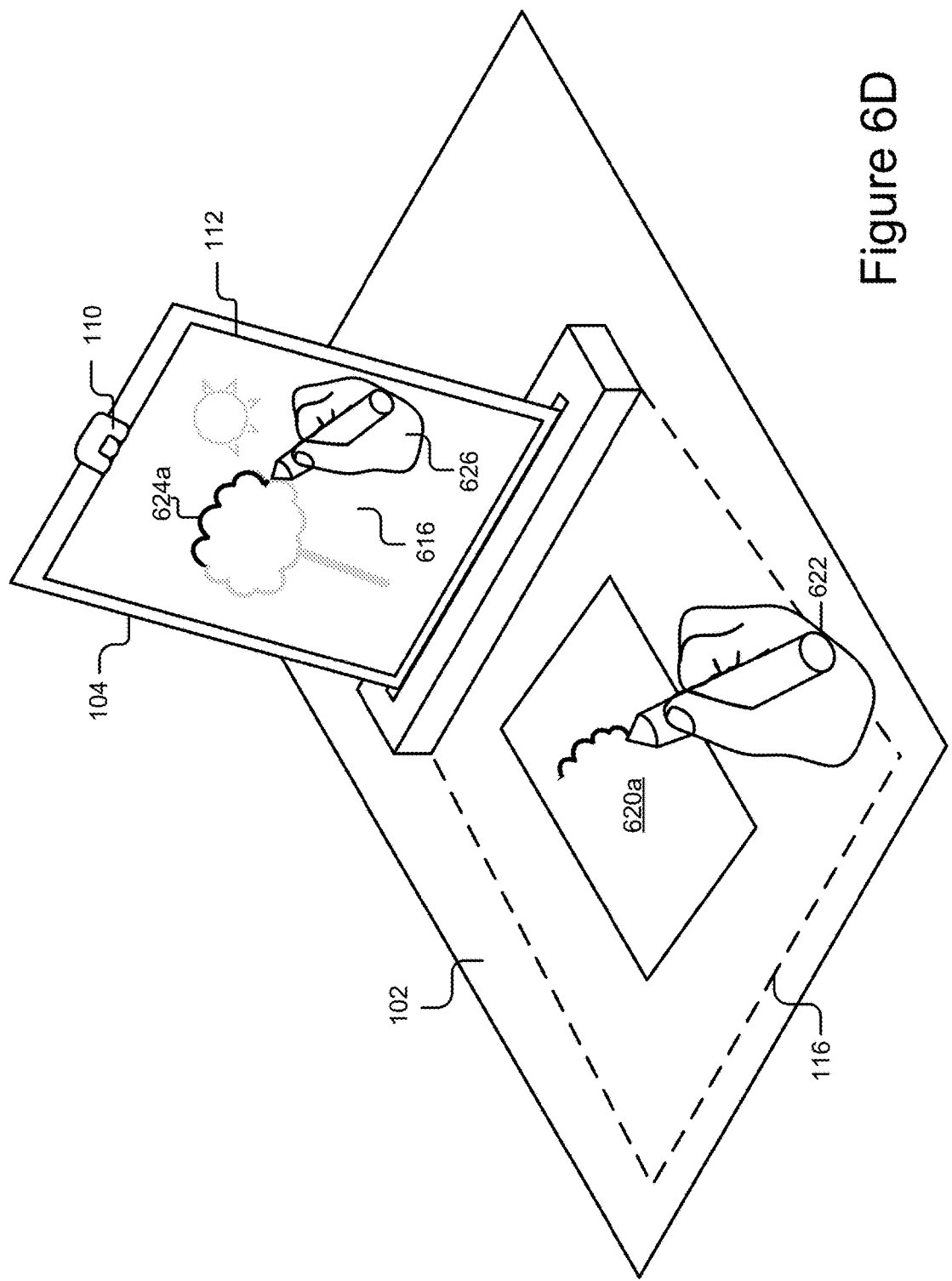

FIG. 6D depicts the reproduction of the traceable image 616 by the user in the physical activity scene. A paper including a physical drawing 620a may be present within the activity scene 116, although it should be understood that any medium may be used. In this example, a user is using a drawing utensil 622 to create the physical drawing 620a. The video capture device 110 captures the image of the drawing area 116. The computer device 104 processes the video stream and displays a virtualization of the physical scene on the display 112 using the methods discussed elsewhere herein.

In some implementations, the computing device 104 display a virtualization of the users hand/drawing utensil 626 in a corresponding relative position on the display 112. By displaying the virtualization of the hand/drawing utensil 626, a user is able to virtually trace the traceable image 616 by moving the drawing utensil 622 while looking at the virtualization of the drawing utensil 626 as it appears on the display 112. As shown in FIG. 6D, the virtualization of the physical drawing 624a is overlaid with the traceable drawing 616 allowing a user to follow the pattern depicted by the instructional/traceable drawing 616 to accurately reproduce it. In some embodiments, the virtualization of the hand/drawing utensil 626 may be semi-transparent, allowing a user to view the traceable image 616 through the hand/drawing utensil 626. In some embodiments, the activity application 214 may be configured to detect a drawing point of the drawing utensil 626 to determine which portion of the traceable drawing 616 is being worked on at that instance in time.

Figure 6E:
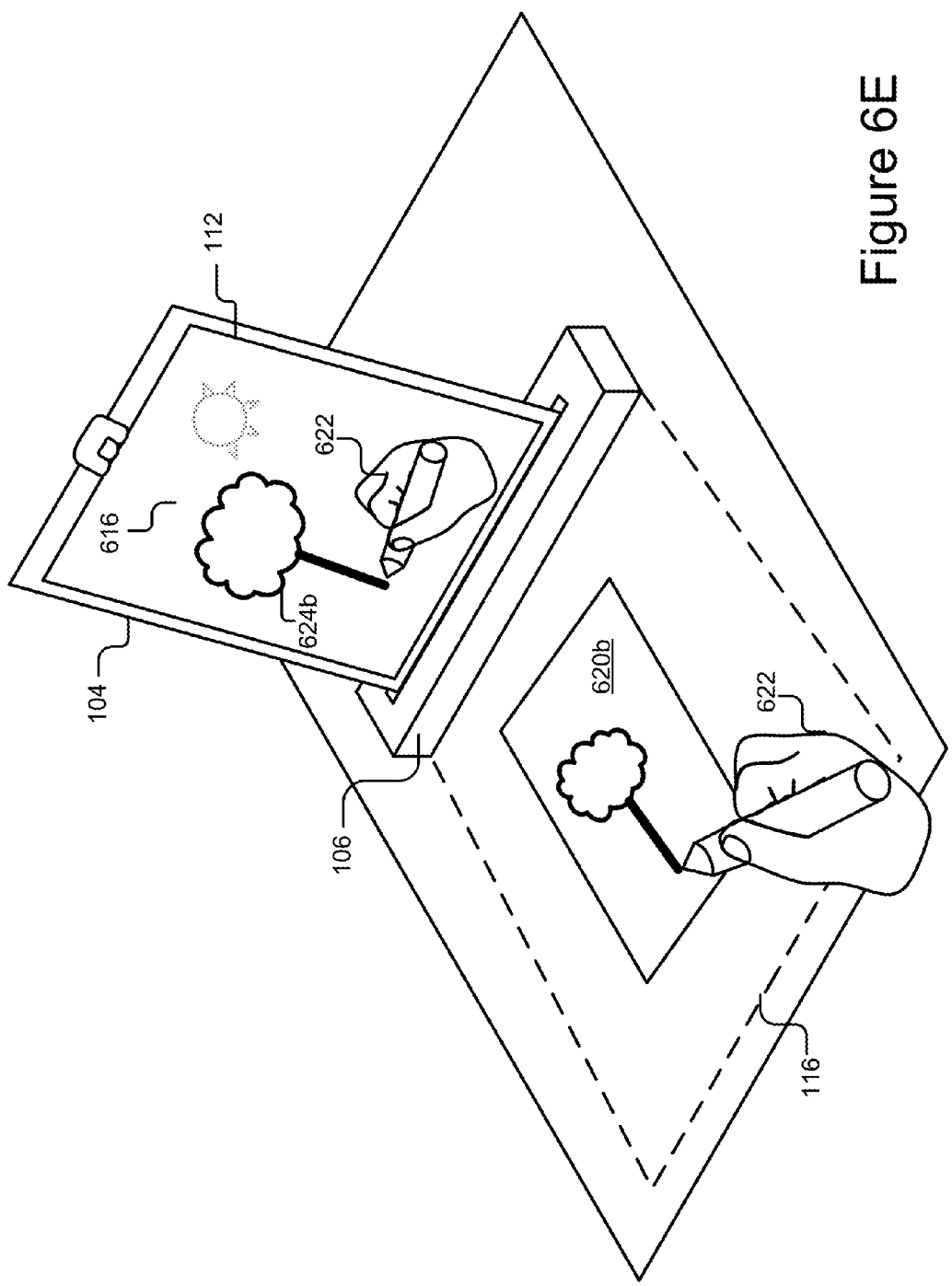

FIG. 6E depicts a second (later) point in time where the user has completed more of the physical drawing 620b. As shown, the user has completed the tree not the sun. The display 112, displays a virtualization of the physical drawing 624b that includes the completed image of the tree overlaid on the traceable image 616.

FIG. 6F depicts a third (still later) point in time where the user has now drawn a portion of the sun in the physical drawing 620c. Correspondingly, the virtualization of the physical drawing 624c includes the completed tree and a portion of the sun. The virtualization of the physical drawing 624c may be overlaid on the traceable drawing 616, such that a user may be able to determine if any portions of the traceable drawing 616 have not been drawn in the physical drawing 620c. In other words, the undrawn portion of the traceable drawing 616 is shown in a visually distinguishable format (e.g., semi-transparent grey lines, dotted lines, colored lines, etc.) to communicate to the user that it still need completing, while the rest of the traces of the traceable image 616 are overlaid with the virtualized lines draw by the user as discussed elsewhere herein. For example, the detection engine 212 may process the video frames being captured to replace the background aspects (e.g., white paper) with a transparent layer and then overlay the frames with the traceable image 616 so the drawn lines fill in the trace lines of the traceable image 616.

In some implementations, the traceable image 616 may appear visually semi-transparent in the portions where the virtualization of the physical drawing 624c are overlaid on the traceable image 616. This allows both the traceable image 616 and the virtualization of the physical drawing 624c to both still appear on the display 112. In further implementations, the traceable image 616 may be comprised of a set of strokes, which are displayed sequentially. This example allows a user create the physical drawing 620 one stroke at a time and move on to the next stroke after a previous stroke has been drawn. The activity application 214 may display the separate strokes once it is detected that the previous stroke has been completed within a certain degree of confidence. Alternatively, the strokes may be sequentially displayed over a predetermined period and a user may be able change the speed at which the strokes are displayed.

Figure 6G:
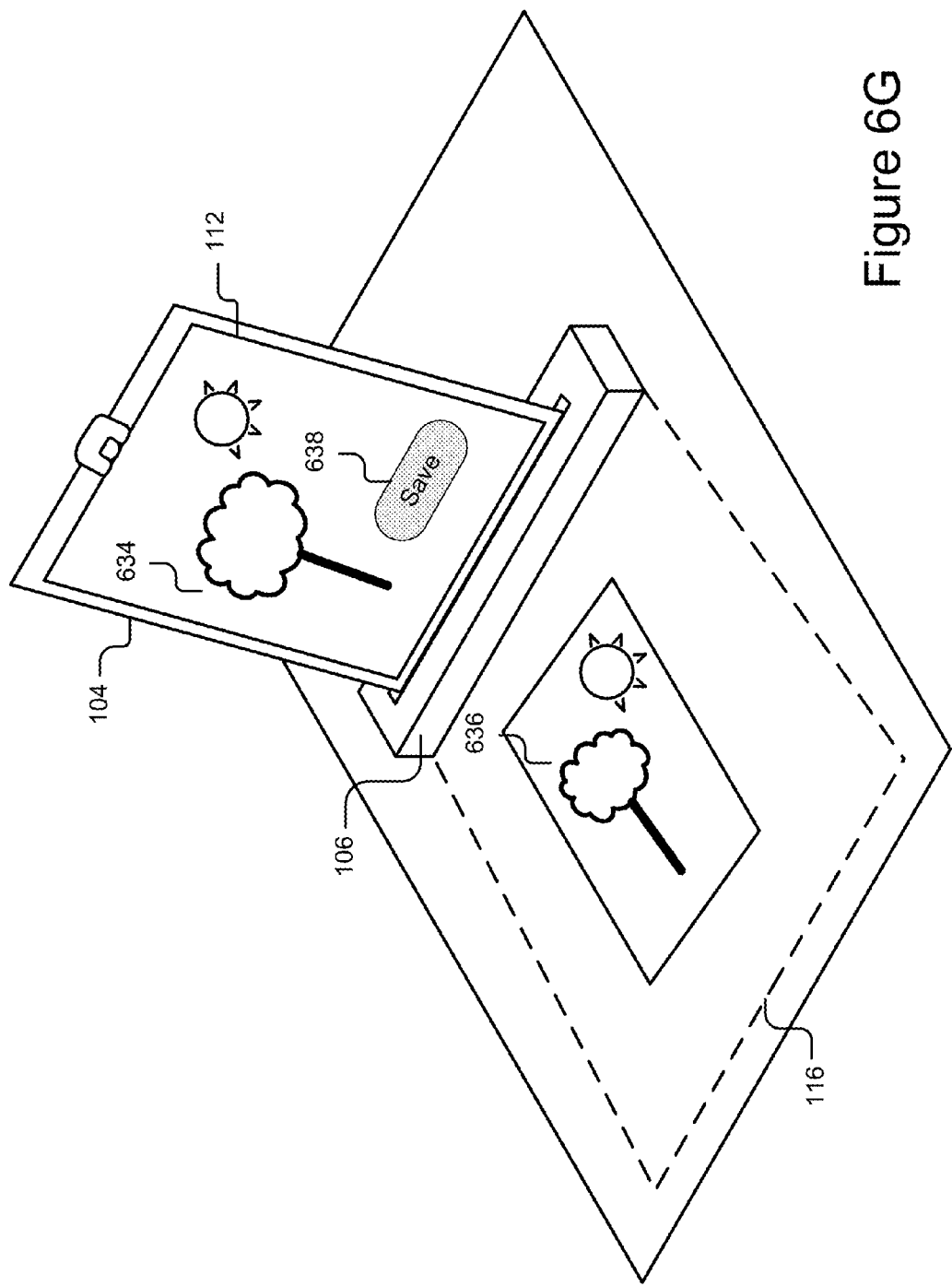

FIG. 6G depicts at point in time where the physical drawing 636 is complete. In some embodiments, the detection engine 212 detects the physical drawing 636 is complete by determining that no additional lines have been made to the physical drawing 636 over a predetermined period, receiving a user input indicating that the physical drawing 636 is complete, performing a comparison between the contours of the physical drawing 636 and the traceable image 616 and determining that all the traceable lines of the traceable image 616 have been reproduced within a certain degree of confidence (e.g., 75-100%, etc.), etc.

In some implementations, upon completion, the computer device 104 may display a save option 638 for a user to interact with in order to store the virtualization of the physical drawing 634. In some embodiments, the user may be able to save the captured video showing the creation of the physical drawing, a motion image (e.g., GIF) derived from the image frames of the video, and/or still images from video. In some embodiments, the computer device 104 may provide a user-selectable sharing option, allowing a user to send an image or video of the physical drawing 636 and/or the creation of the physical drawing 636. For example, responsive to the selection to share the video, the activity application 214 utilizes an application programming interface (API) to upload the video to one or more social network server(s) (e.g., Facebook, Instagram, Twitter, etc.) and/or video distribution servers (e.g., YouTube) (embodied by servers 202) and share it (e.g., by posting it to the user's content stream and/or sending an electronic link to electronic addresses of other users specified by the user). In further examples, the activity application 214 may utilize an API of a dedicated server hosting content for the activity application 214 to upload and send an electronic link to the video to the electronic addresses retrieved from an address book file accessible on the computing device 104 and/or input by the user. Other variations are also possible and contemplated.

Figure 6H:
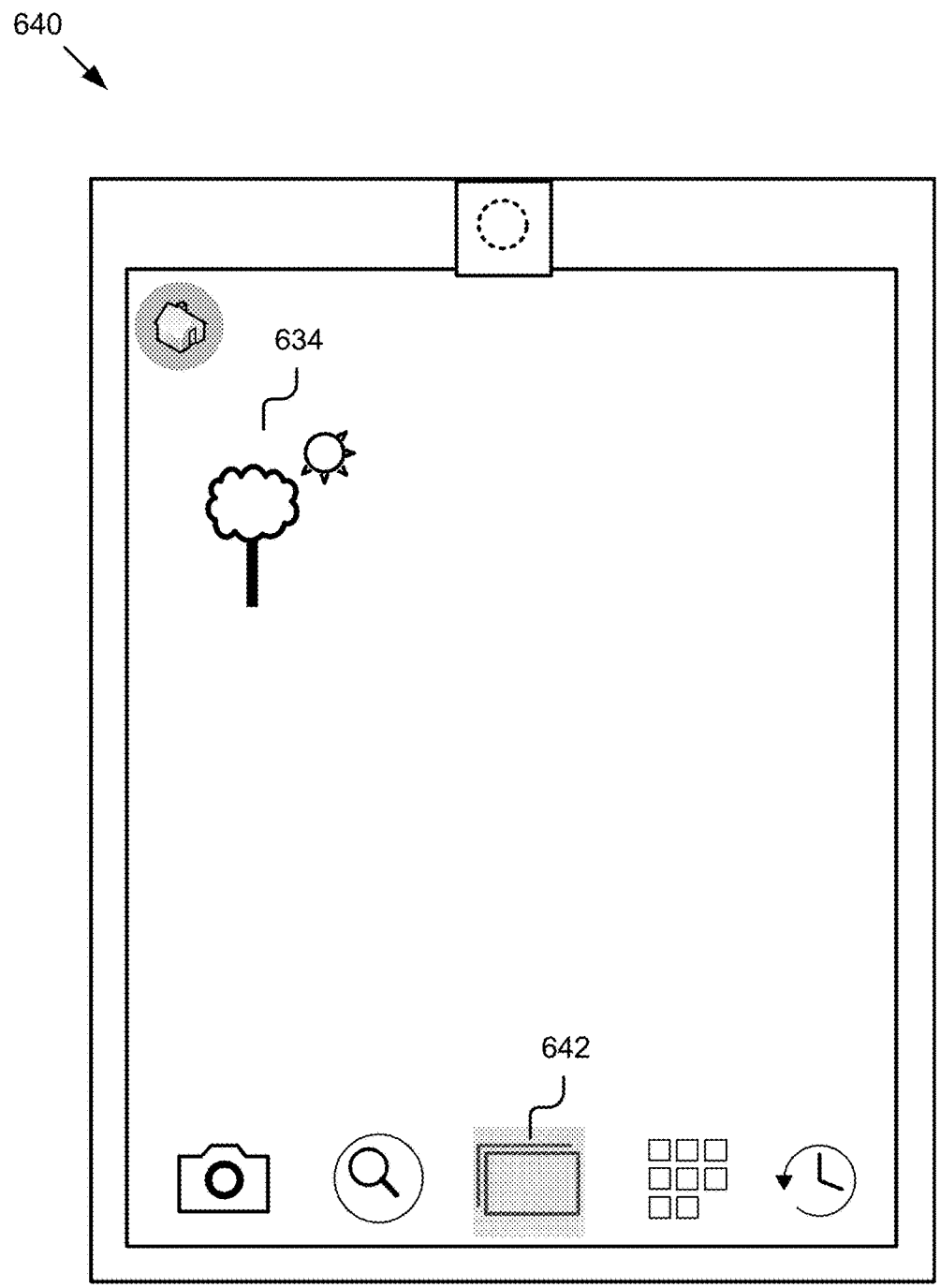
FIG. 6H is a graphical representation of an example user interface including virtualized drawings.

FIG. 6H displays a user interface 640, displaying a gallery tool 642 that a user may select to view a previously saved work 634, view a video of the creation of the work, share the work with other users, etc.

Figure 7A:
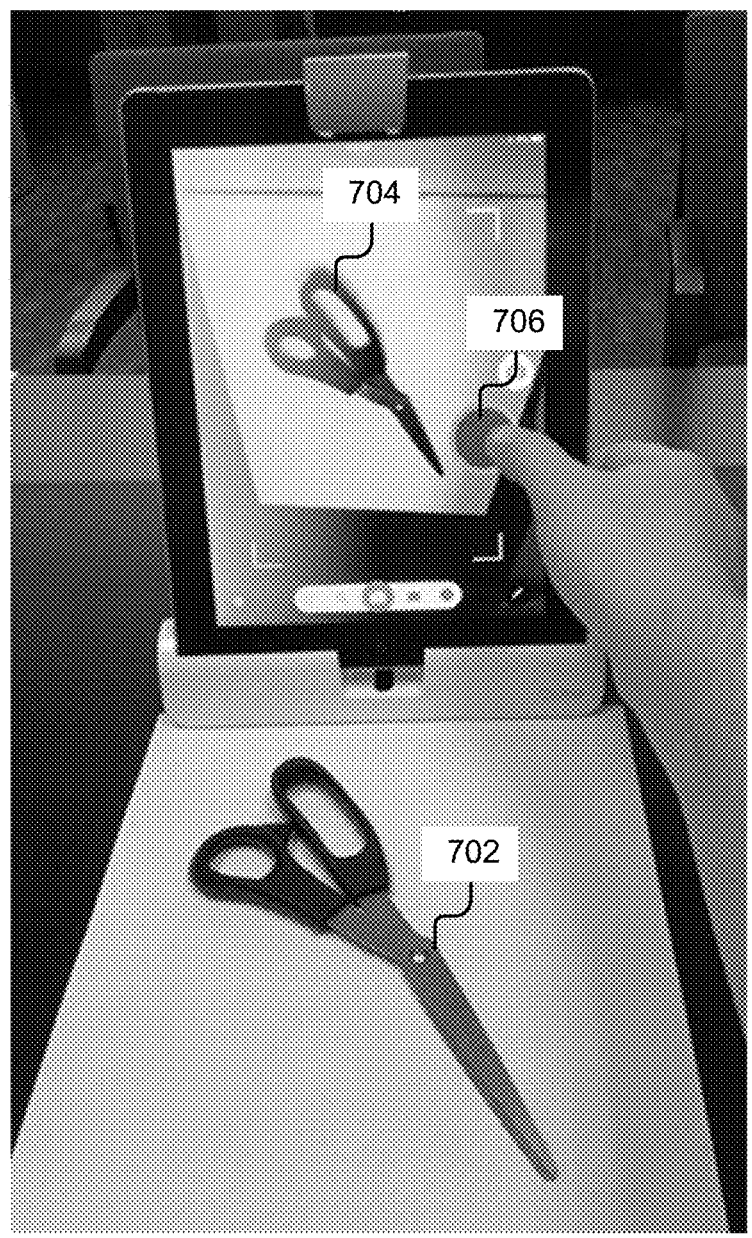
FIGS. 7A-7G are graphical representations of an example platform for capturing an image of a physical object and guiding drawing of that object in a physical activity scene.

FIGS. 7A-7G are graphical representations of an example platform for capturing an image of a physical object and guiding drawing of that object in a physical activity scene. FIG. 7A shows a pair of scissors 702 and an image 704 of the scissors 702. The image 704 is captured using the video capture device 110 via an image capture interface of the activity application 214. The interface includes a camera button 706 selectable by a user to take the image 704.

Figure 7B:
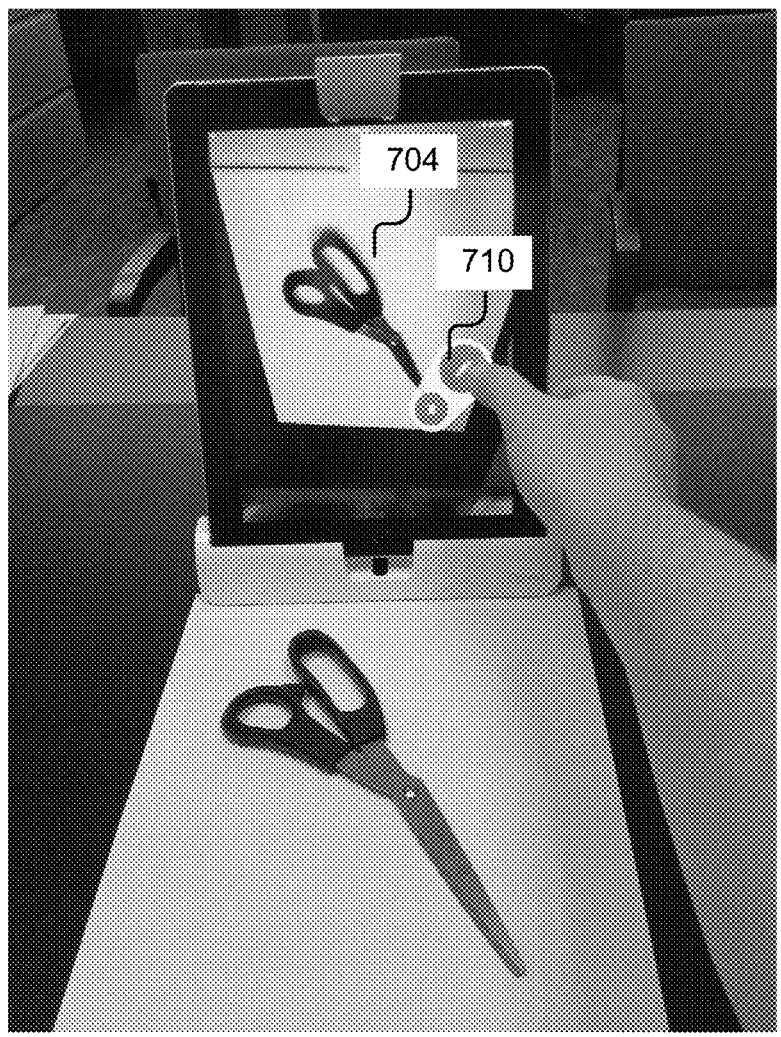
Figure 7C:
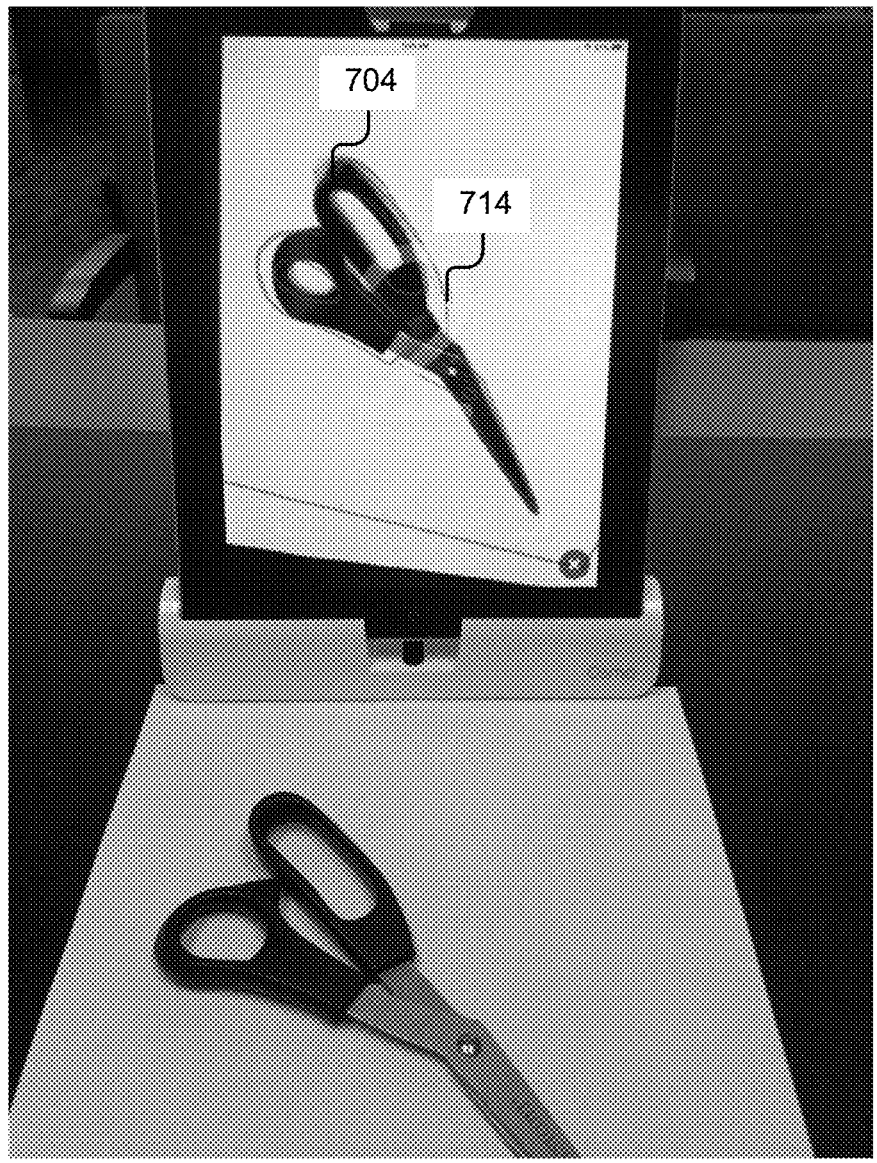

In FIG. 7B, an edit button 710 may be provided to a user. In response to the user selecting the edit button 710, the activity application 214 converts the image 704 into a traceable image 714 as shown in FIG. 7C. As shown between FIGS. 7B and 7C, the user may input instructions to resize and reposition the image 714 in the interface. FIG. 7C further depicts the traceable image 714 overlaid on the image 704. A user may move and/or resize the traceable image 714.

Figure 7D:
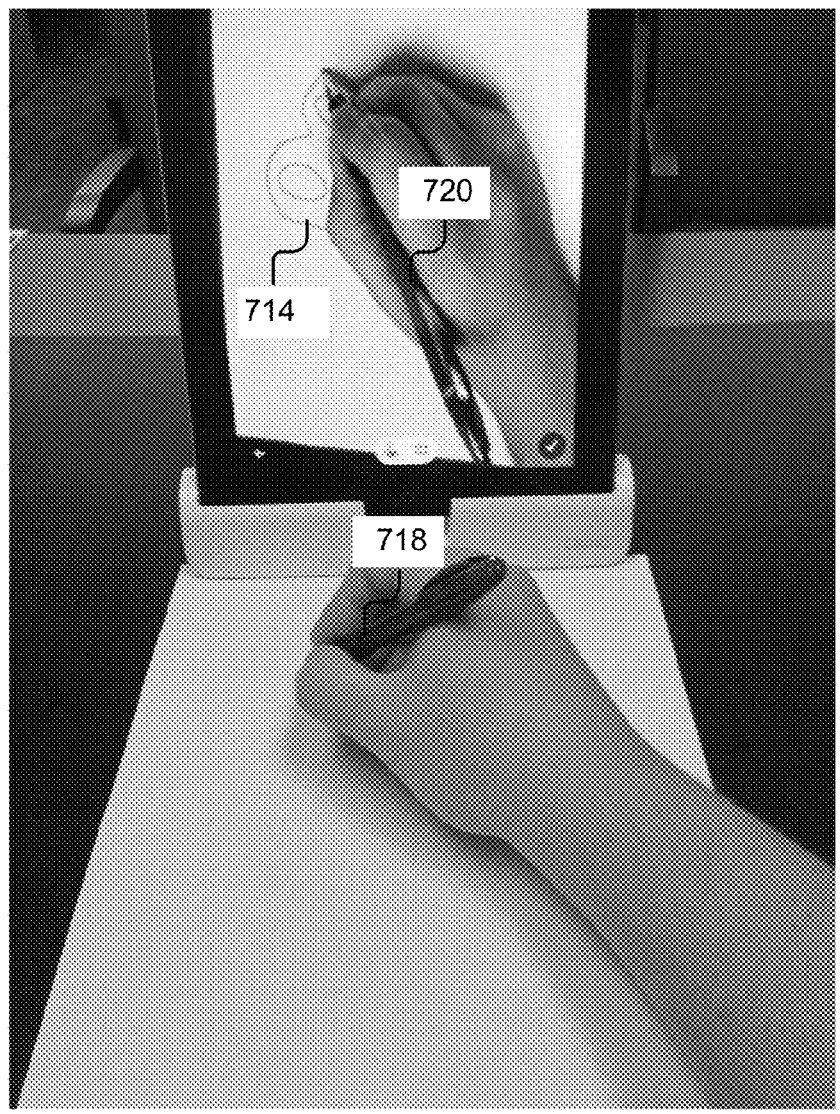
Figure 7E:
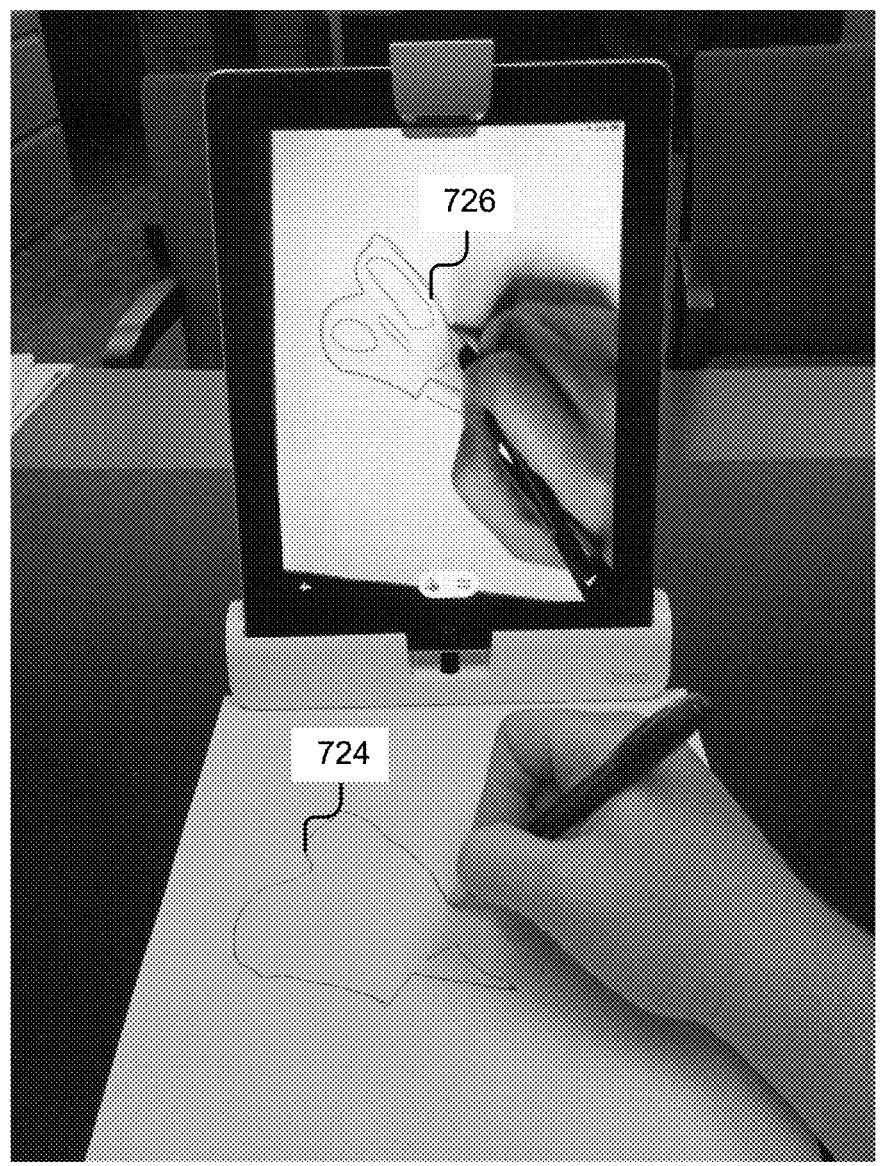

FIG. 7D depicts the drawing utensil 718 and a video frame including the drawing utensil 720 overlaid with the instructional image 714 on the display 112. FIG. 7E depicts the physical drawing 724 at a later point in time where the user is drawing the outline of the handle of the scissors 702. An updated image frame of the video is overlaid with the traceable image 714 showing the user's progress on the physical drawing 726.

Figure 7F:
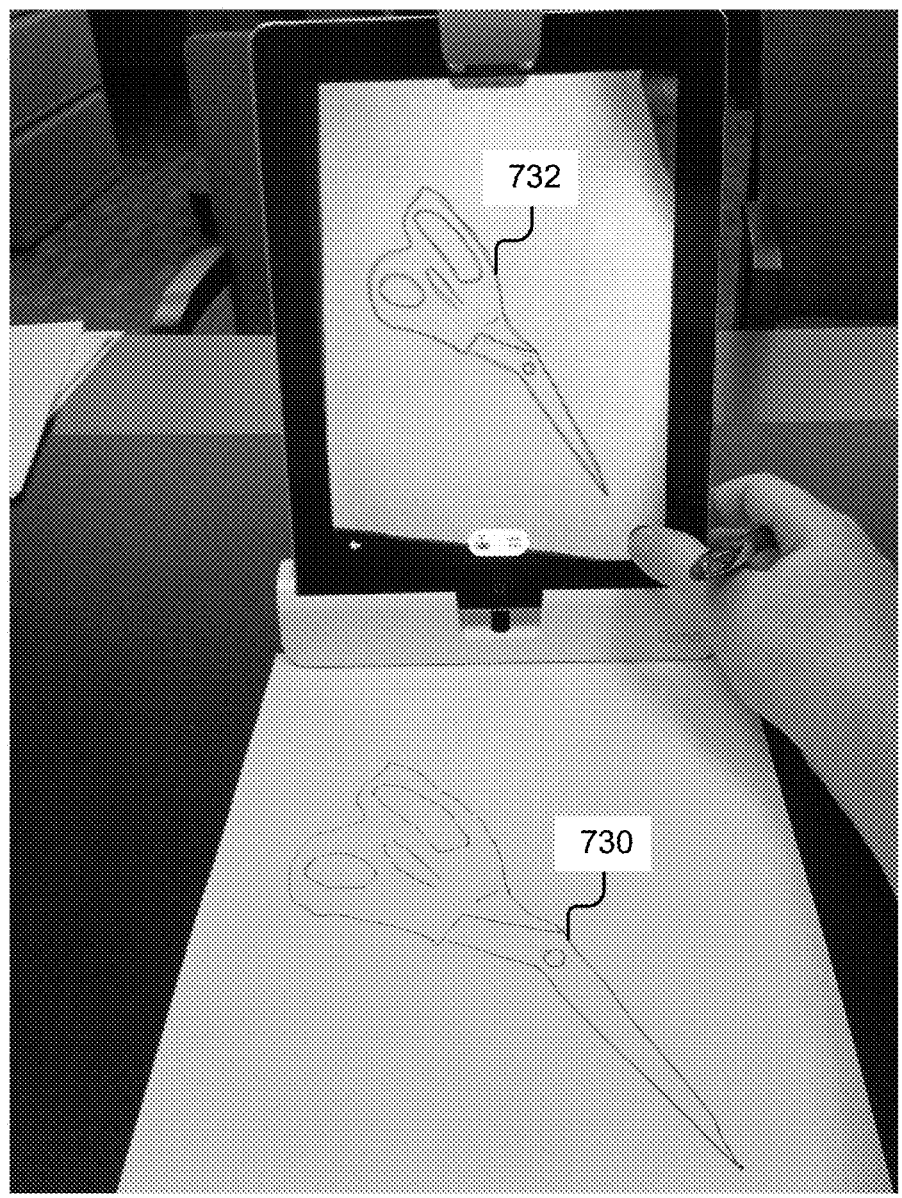
Figure 7G:
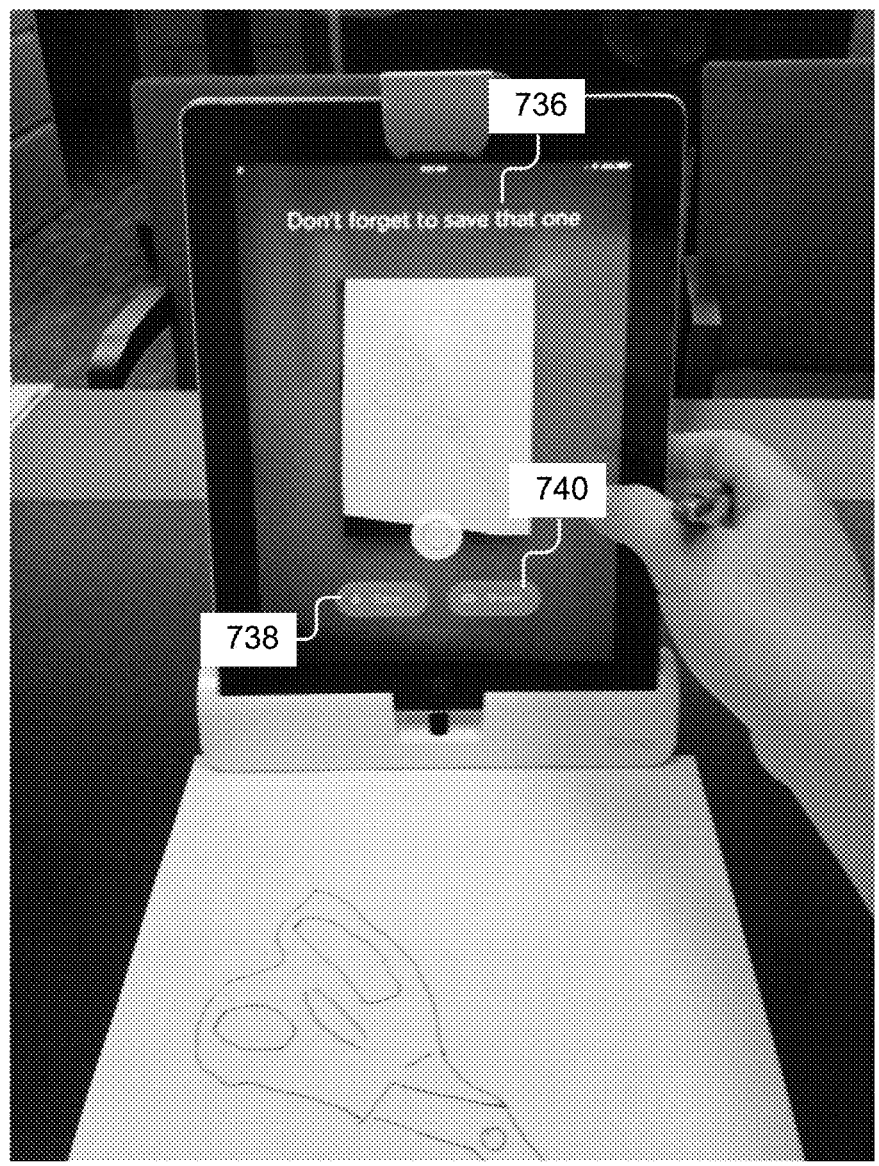

FIG. 7F depicts the completed physical drawing 730 and the corresponding virtualized version of the completed physical drawing 732. The depicted interface includes user-selectable options to exit from the interface and/or further edit the drawing. FIG. 7G depicts a user interface that includes a reminder message 736 to save the digital representation of the physical drawing 732 as well as a video image and/or still images of the creation process, a corresponding save button 738 to save that information, and/or a share button 740 to share the digital representations of the physical drawing 732 with other users (via electronic message as an attachment or link to an online host, social networks, video disturbing networks, etc.). The message 736 may be a reminder, positive congratulations, or any other message. The save button 738 may save the completed physical drawing 730, the virtualization of the completed physical drawing 732, and/or a video of the creation of the drawing, etc.

Figure 8A:
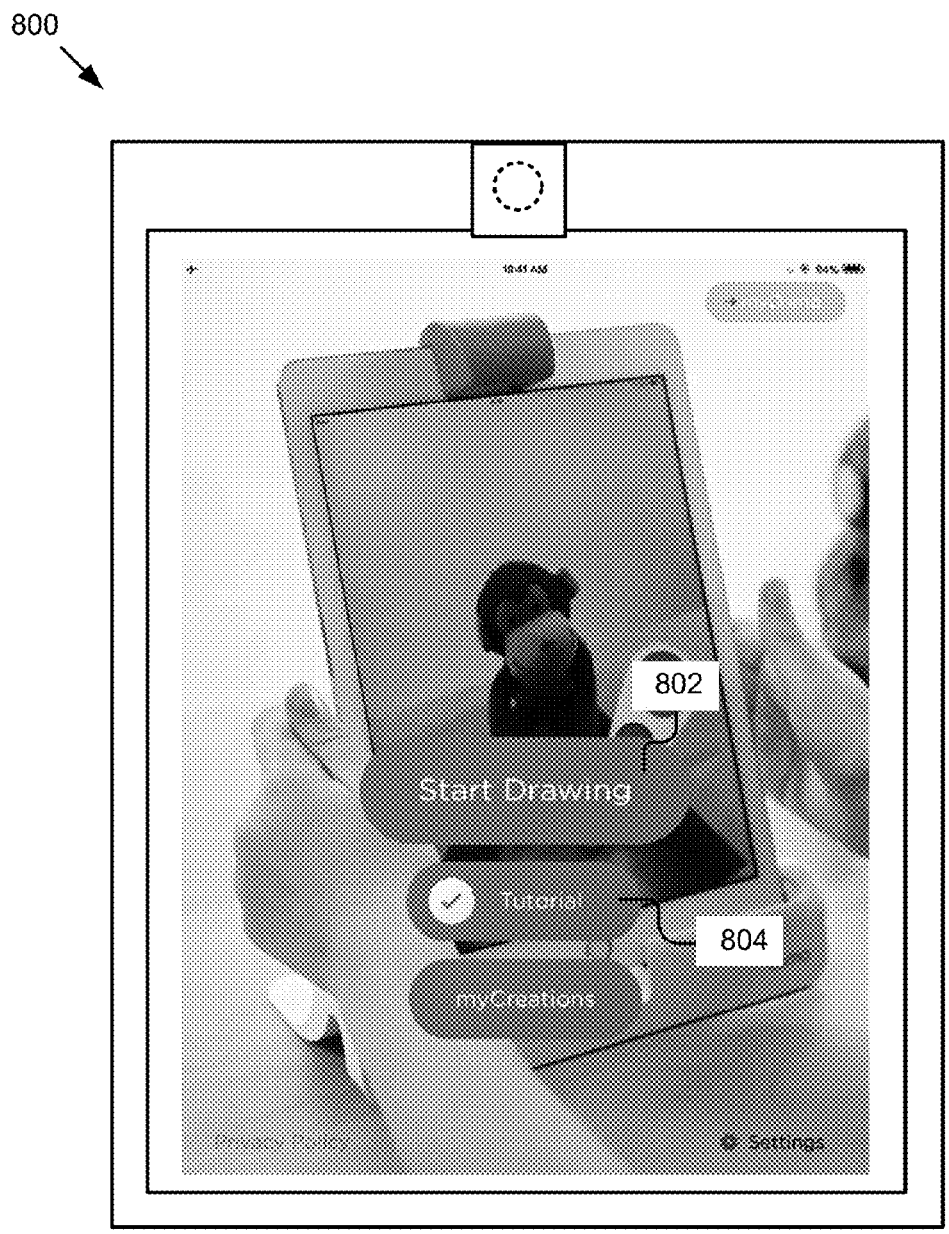
FIGS. 8A-8D are graphical representations of an example user interface providing a tutorial for utilizing the system.
Figure 8B:
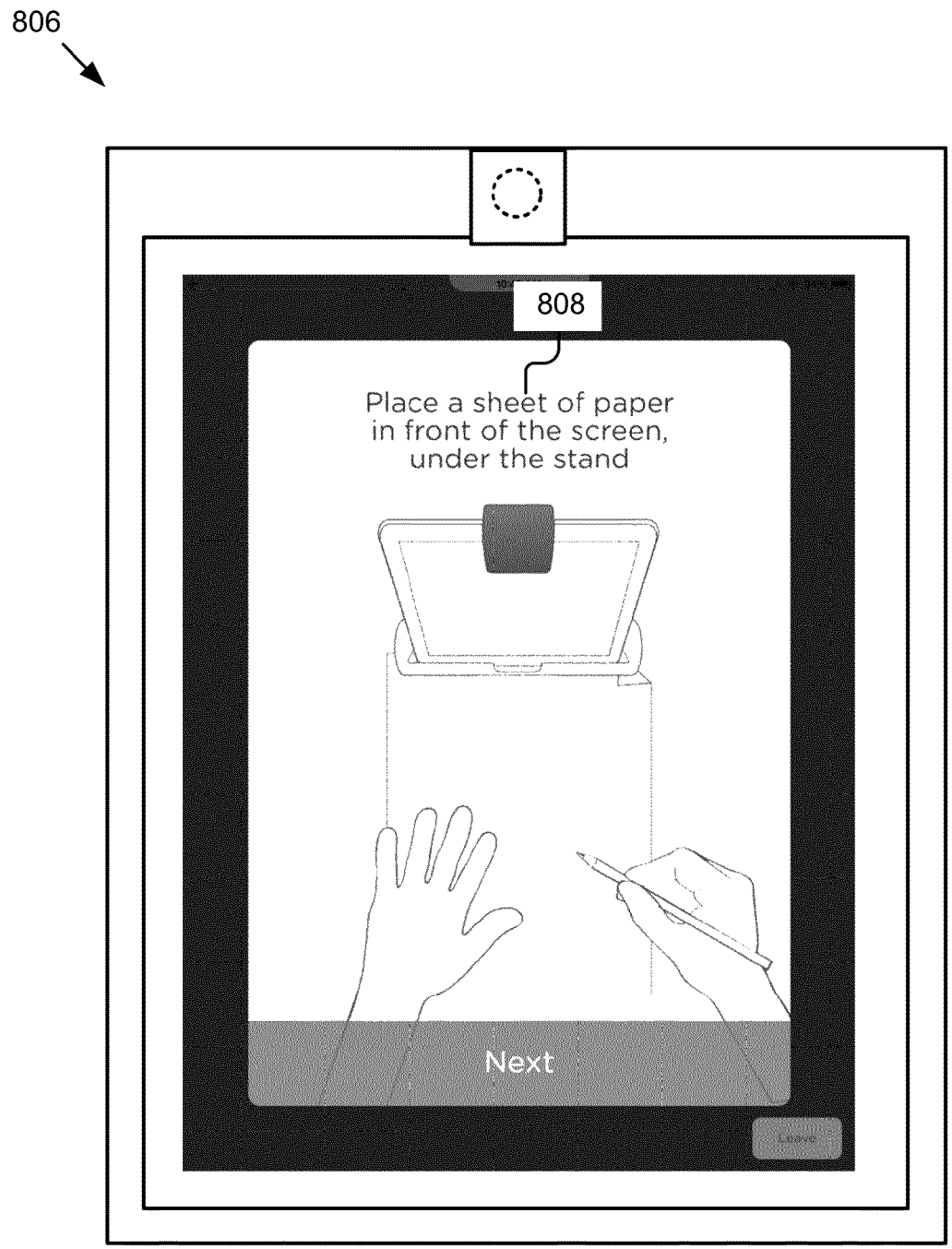
Figure 8C:
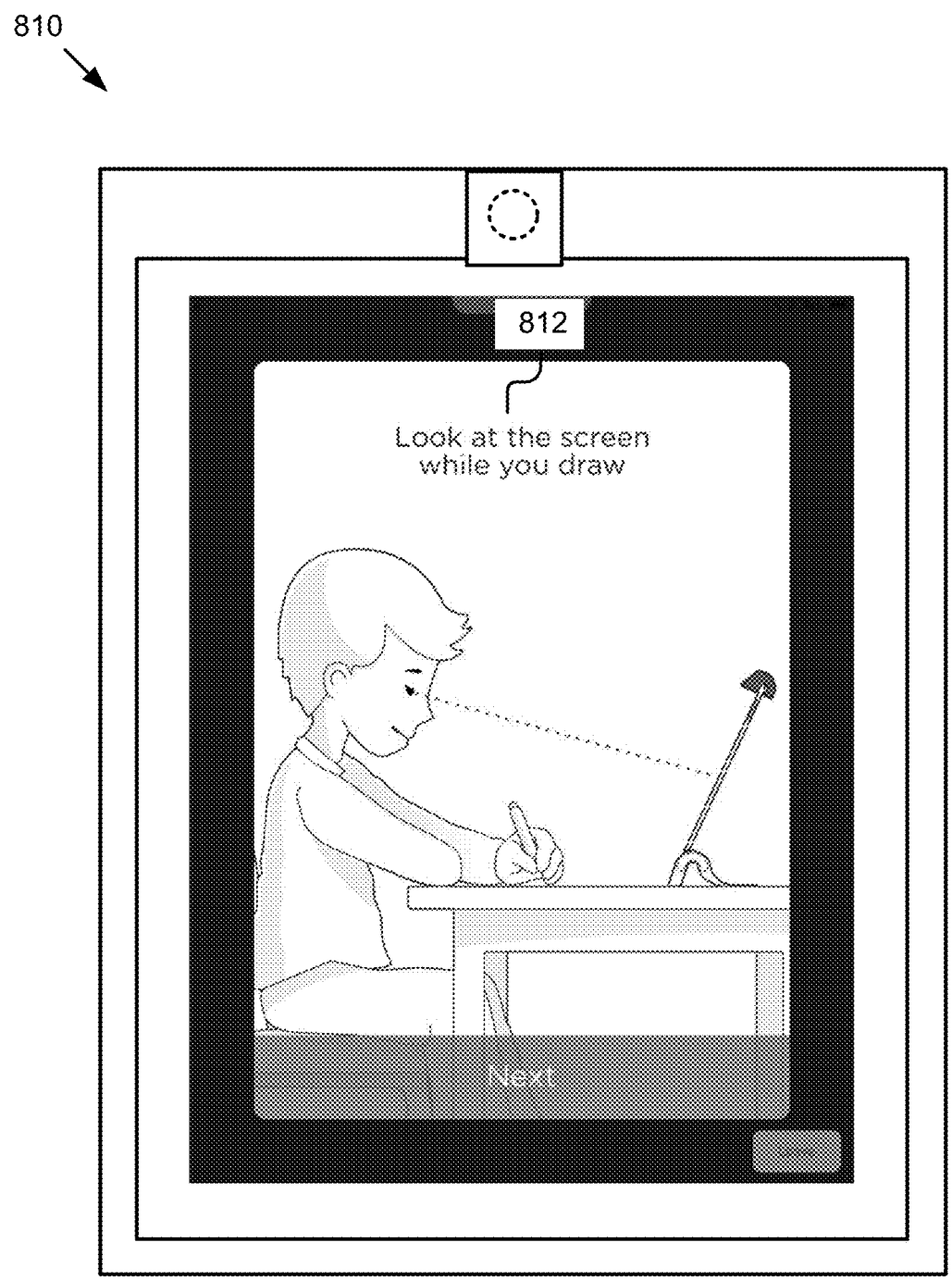
Figure 8D:
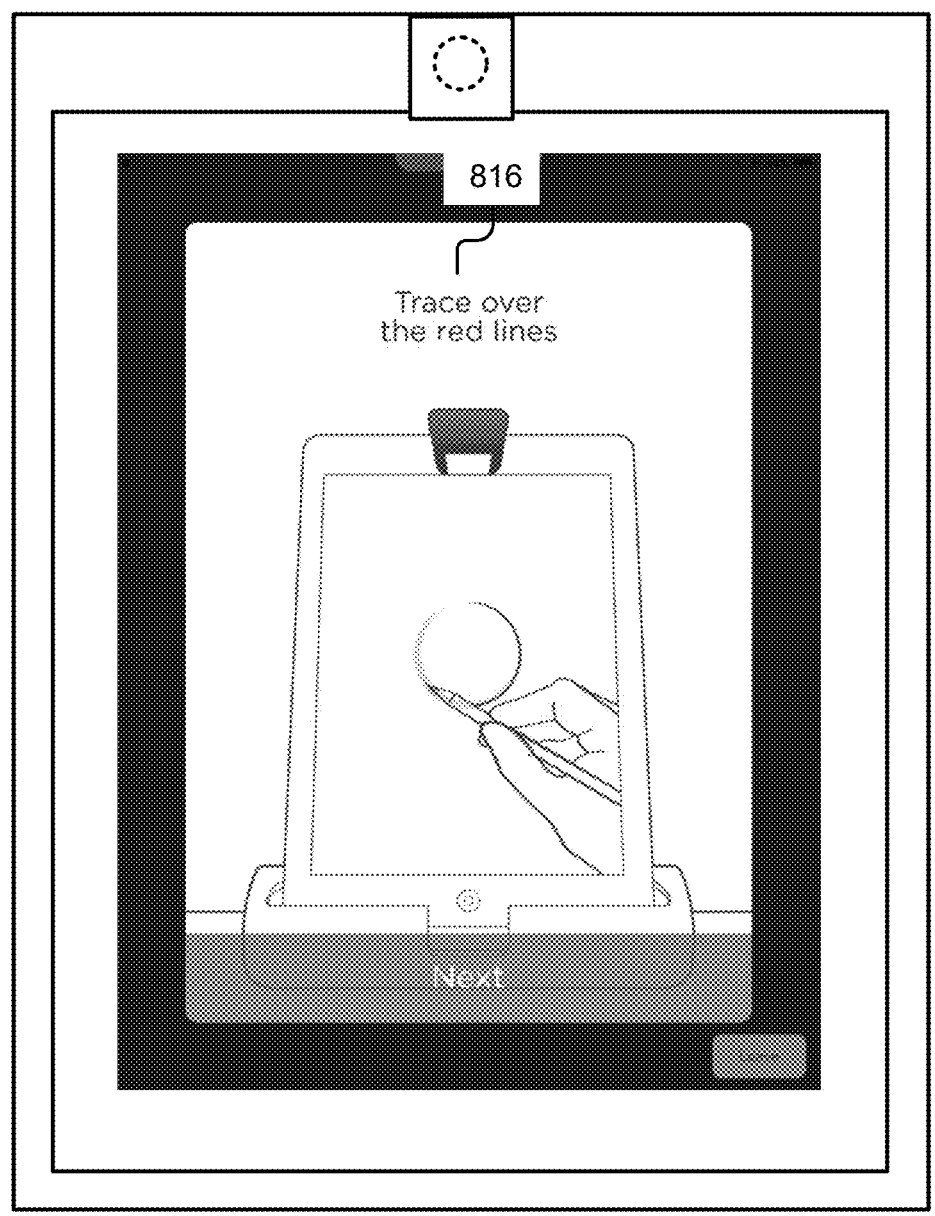

FIGS. 8A-8D are graphical representations of an example user interface providing a tutorial for utilizing the system. FIG. 8A shows an example user interface 800 depicting a start screen. The start screen may include a user-selectable option to start drawing 802 and/or an option to start a tutorial 804. In FIG. 8B, in response to a user selecting to start the tutorial, activity application 214 displays the user interface 806 including an instruction 808. The instruction 808 assists the user in setting up/calibrating the computer device 104 and activity scene/drawing area 116. In some implementations, the instruction 808 instructs the user to place a sheet of paper in front of the screen, under the stand and include an image depicting how setup should appear. In FIG. 8C, the activity application 214 displays a user interface 810 providing an instruction 812 that instructs a user how to use the platform (e.g., look at the screen while they draw the physical drawing 114). In FIG. 8D, the activity application 214 displays a user interface 814 providing an instruction 816 that instructs a user how to trace to create the physical drawing 114 (e.g., by tracing over the red lines in the physical activity scene 116 with a writing utensil while referencing the instructional image in the virtual scene).

Figure 9A:
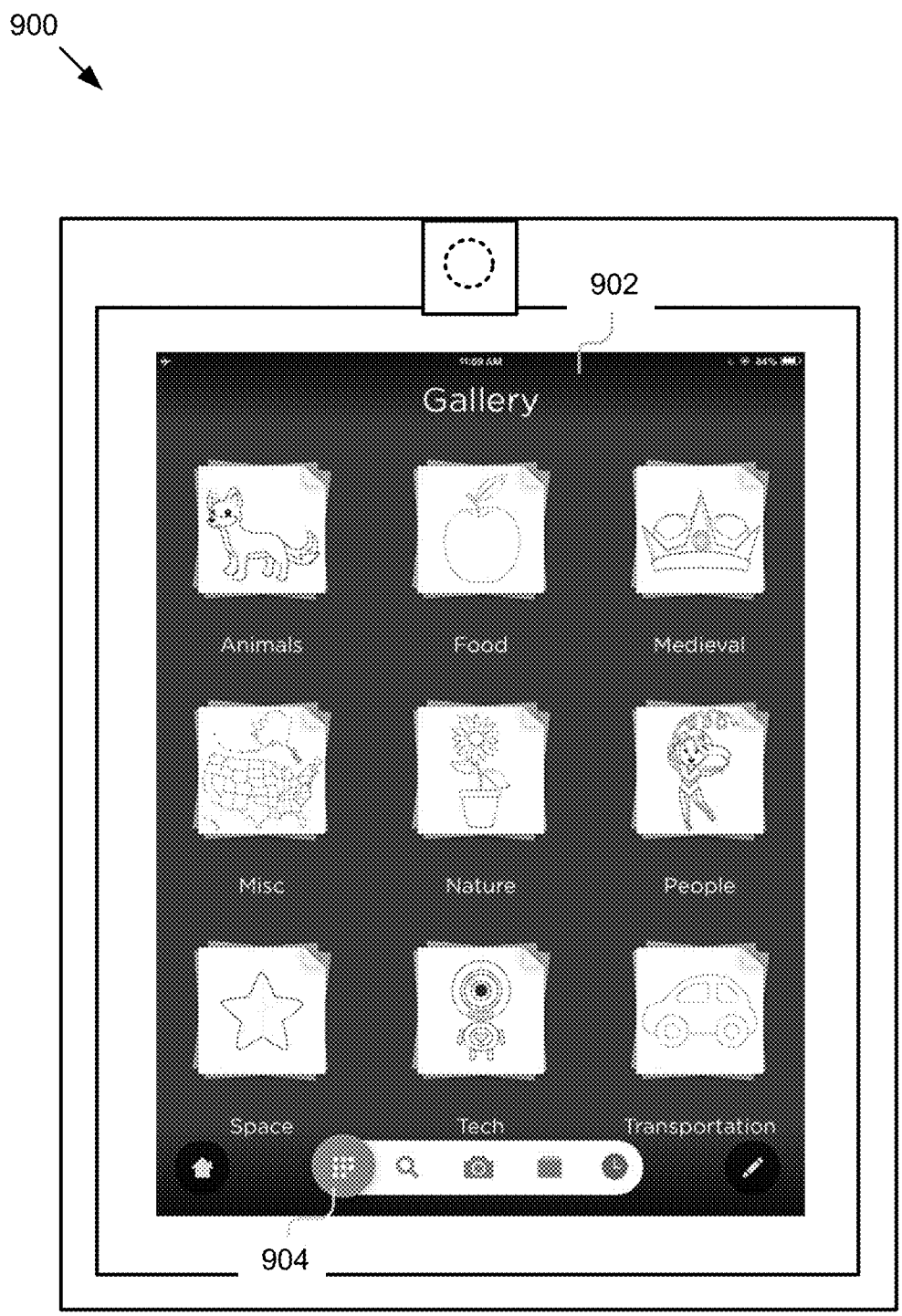
FIGS. 9A-9H are graphical representation of example user interfaces for selecting a virtual image and providing drawing guidance for reproduction of that virtual image in the physical activity scene.
Figure 9B:
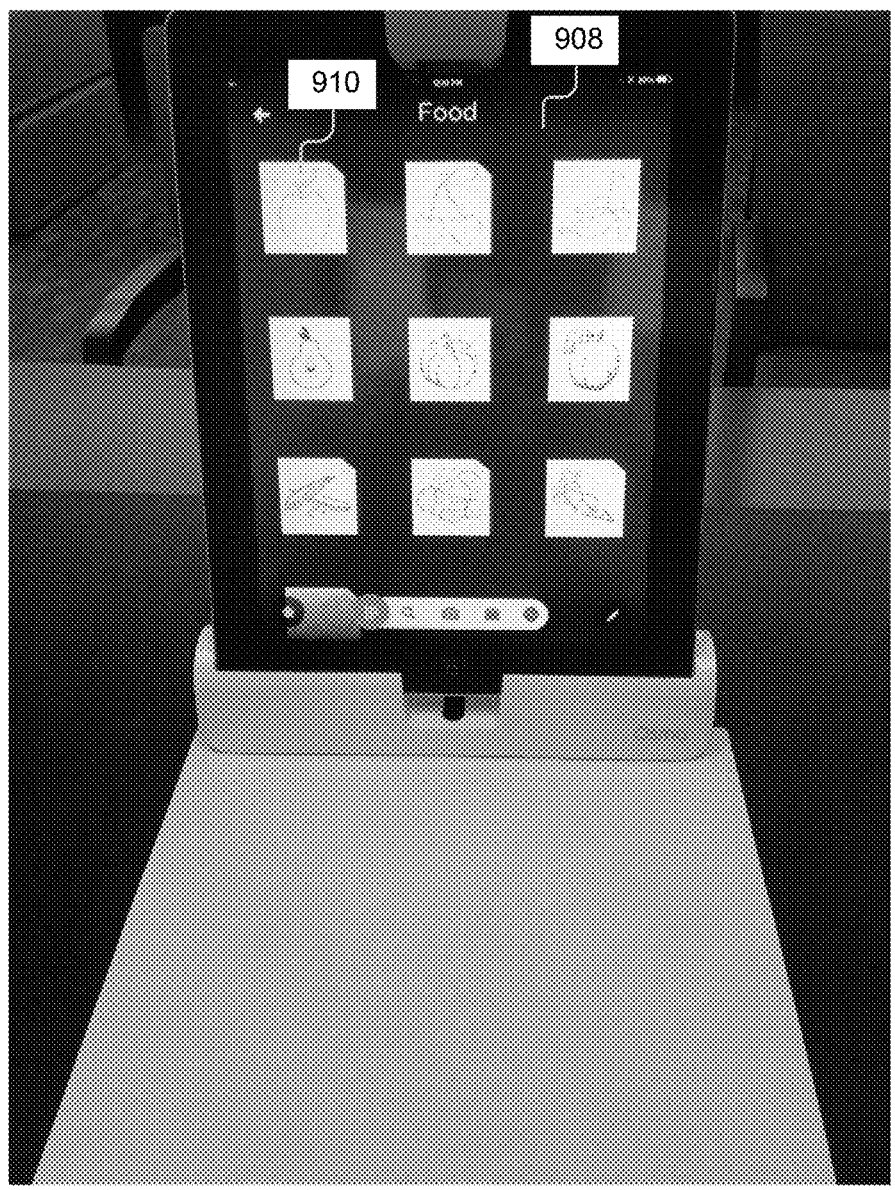
Figure 9C:
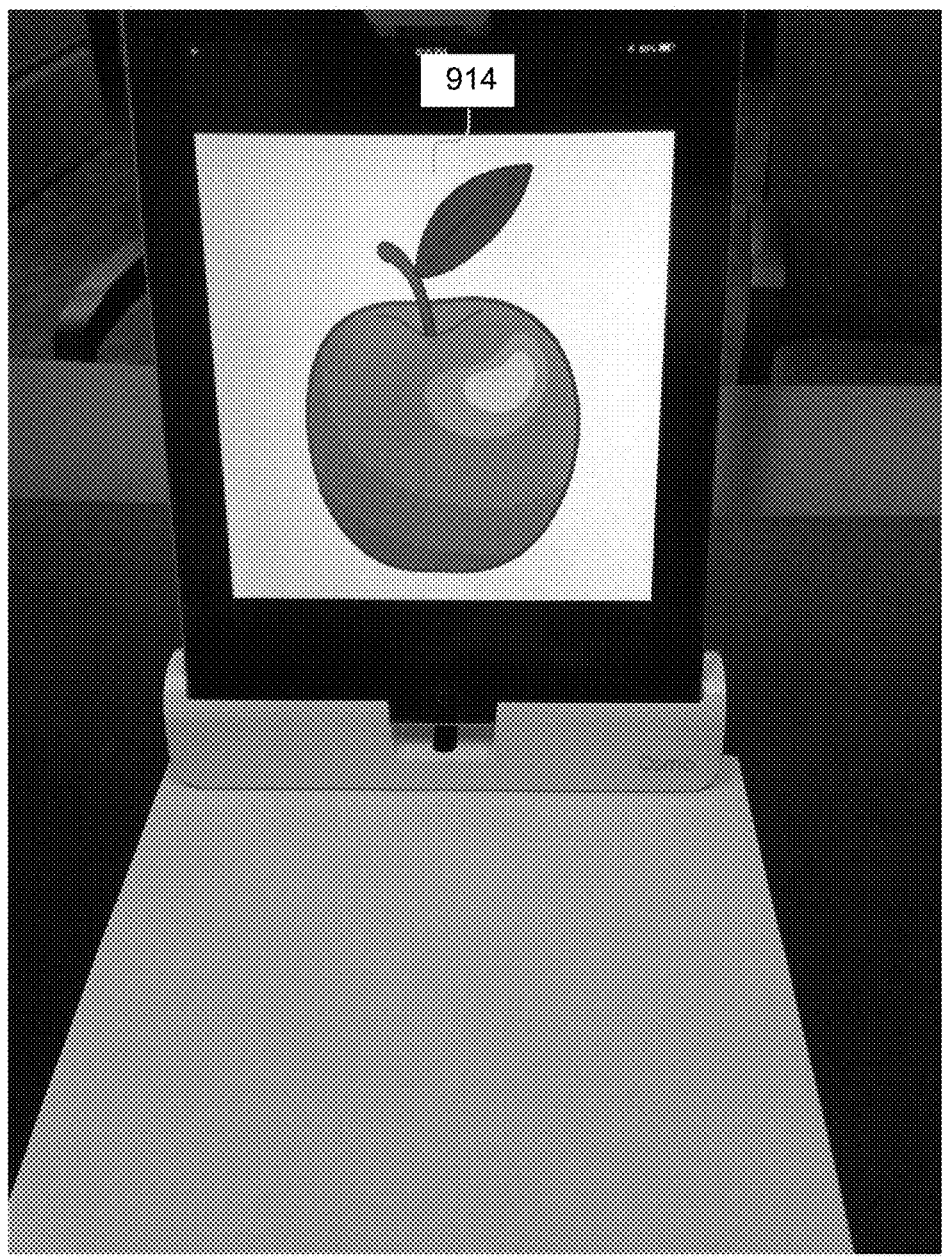
Figure 9D:
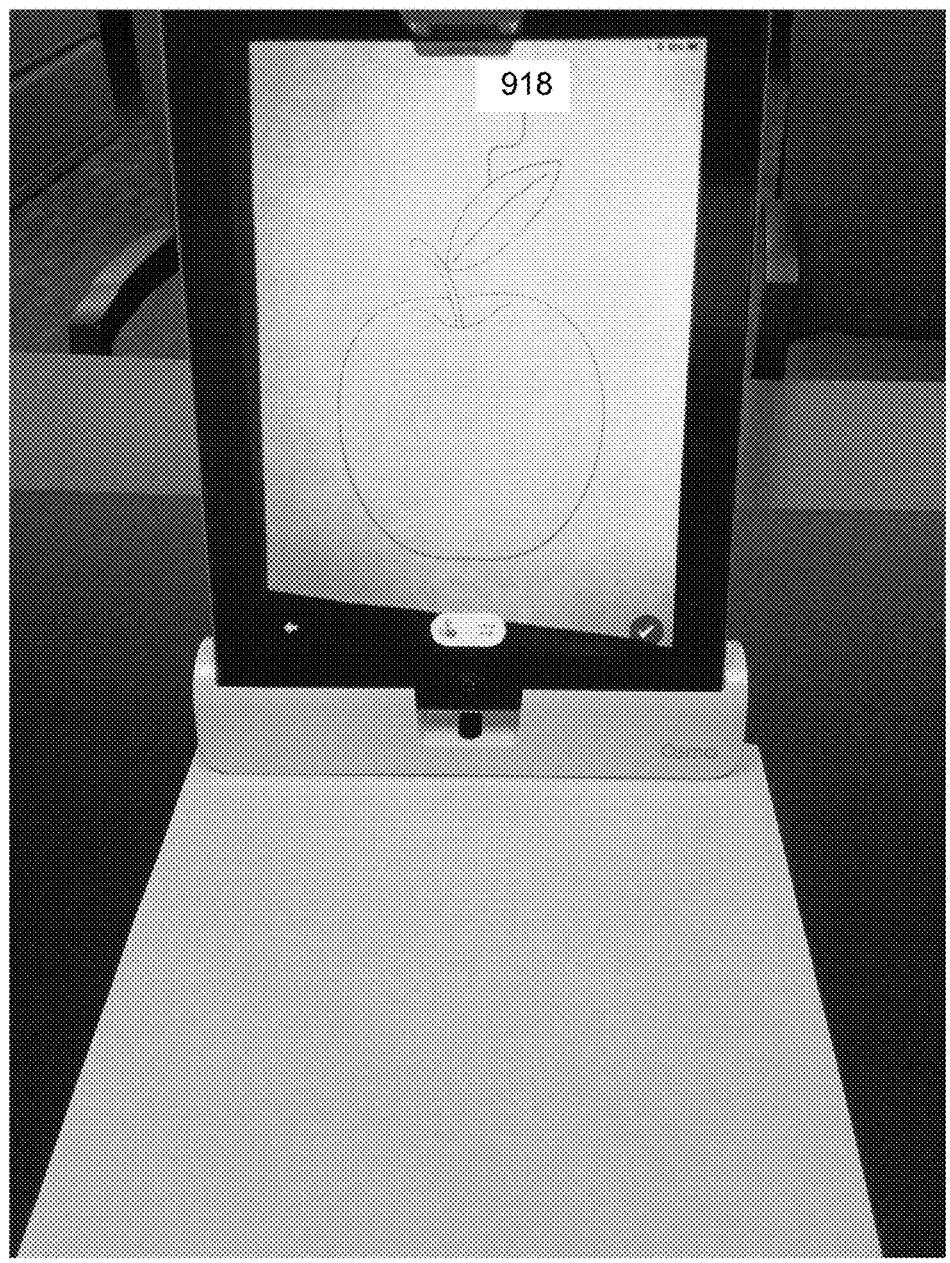

FIGS. 9A-9H are graphical representation of example user interfaces for selecting a virtual image and providing drawing guidance for reproduction of that virtual image in the physical activity scene 116. In FIG. 9A, the activity application 214 displays an example user interface 900 depicting a gallery 902. The gallery 902 may include thumbnails of images organized by topic. The gallery option/tool 904 may be selected by a user to view the images available in the gallery 902. The gallery 902 may include images stored in a local database of images, from an online database of images, from images captured using a camera associated with the computing device and stored in internal or external memory of the computing device, or another suitable source. FIG. 9B, the activity application 214 displays an example user interface 906 that includes subtopics 908. In this example, a user may have selected the "food" topic from gallery 902. The subtopic gallery 908 may display images that relate to the category of the subtopic 908, in this example the images are related to food. Image 910 in the subtopic gallery 908 may be an apple and may be selectable by a user. FIG. 9C, the activity application 214 displays a scene 912 that includes the display of the image 914 of the apple. In FIG. 9D, the activity application 214 displays a scene 916 that includes a traceable image 918 of the image 914 of the apple. In some embodiments the traceable image 918 may be created in response to a request from a user, while in alternative embodiments, the traceable image 918 may be created automatically or may have previously been created and may be retrieved from storage.

Figure 9E:
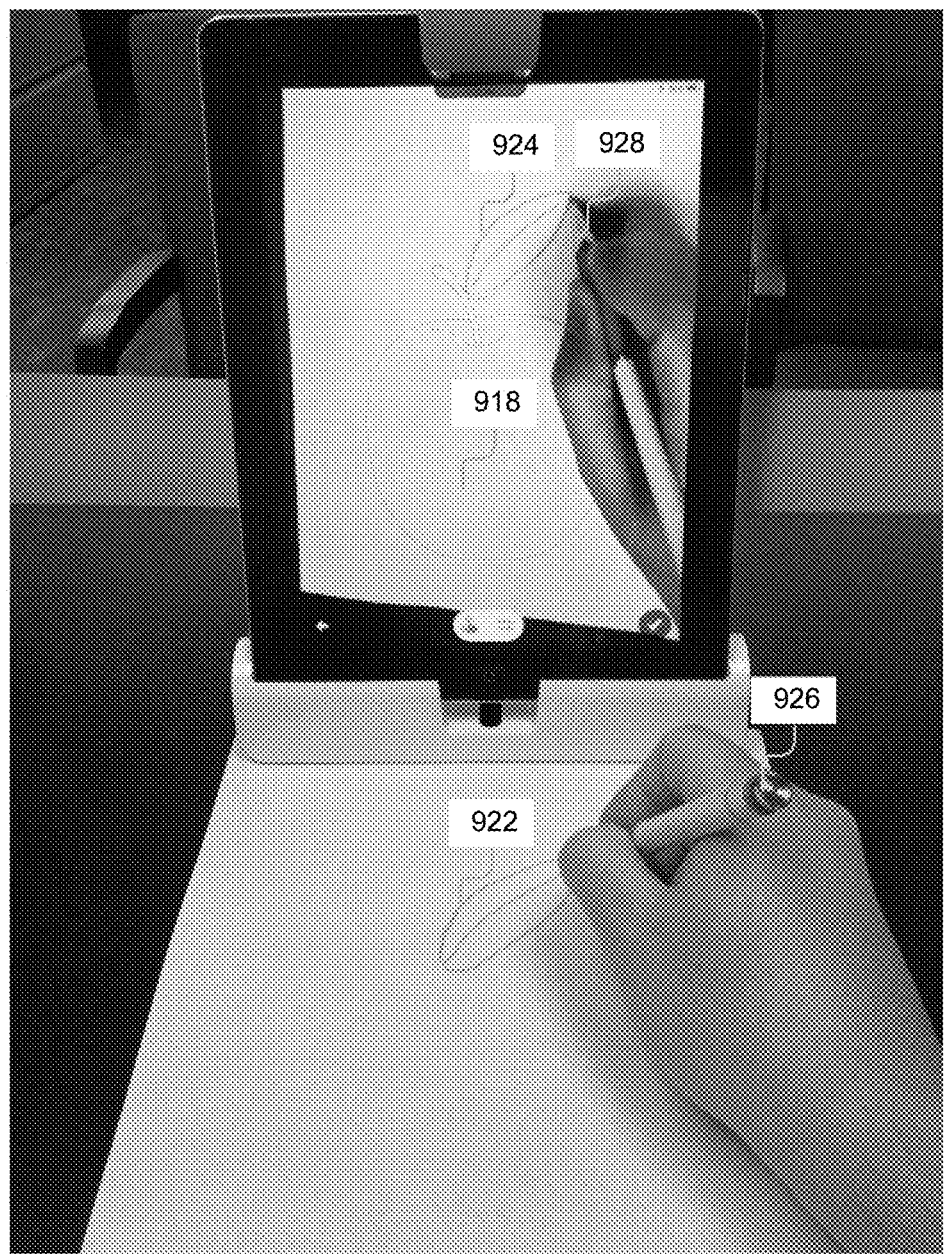

In FIG. 9E, a scene 920 depicts a creation of a physical drawing 922. The video capture device 110 captures the scene including the physical drawing 922 and the drawing utensil 926. The video stream is processed and a virtualization of the physical drawing 924 is displayed overlaid on the traceable image 918. The virtualization of the drawing utensil 928 is displayed relative to the position of the writing utensil 926. As a user moves the writing utensil 926, the virtualization of the writing utensil 928 moves on the display. As the user looks at the display, the user may virtually trace the traceable image 918 by manipulating the location of the virtualization of the drawing utensil 928 and creating the physical drawing 922 as part of the movement to manipulate the virtualization of the drawing utensil 928.

Figure 9F:
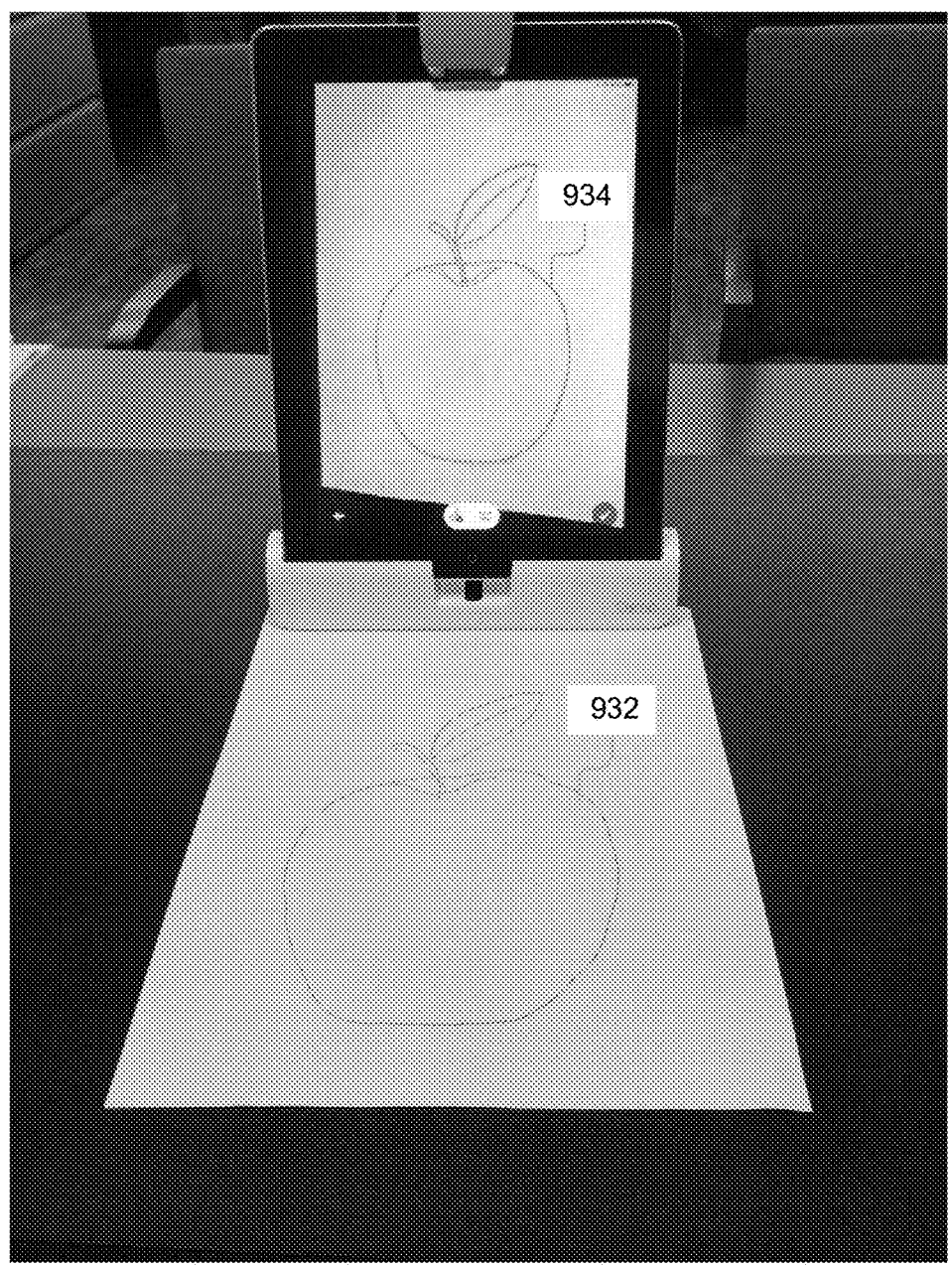

In FIG. 9F, the scene 930 depicts the completed physical drawing 932 and the virtualization of the physical drawing

Figure 9G:
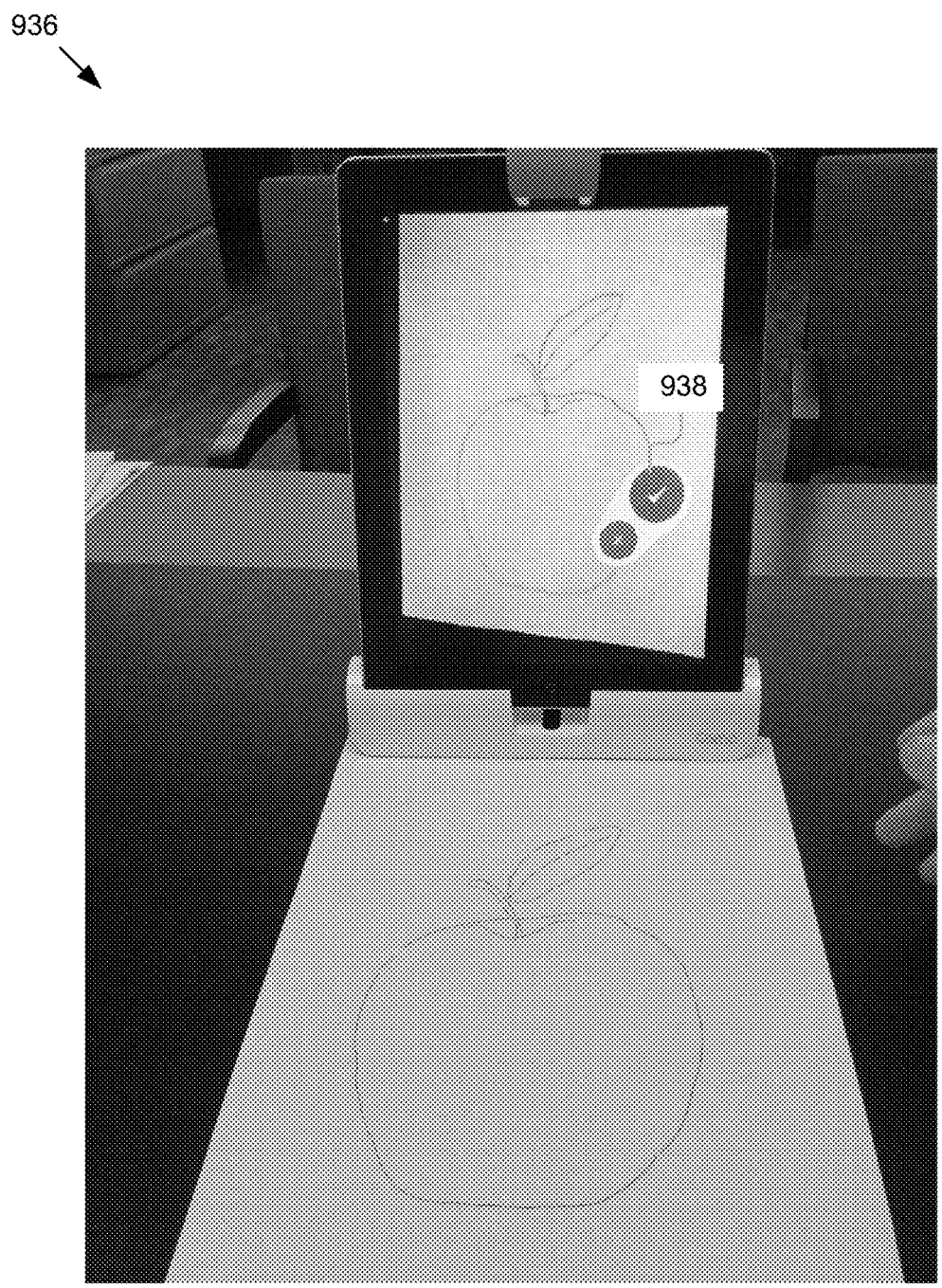
Figure 9H:
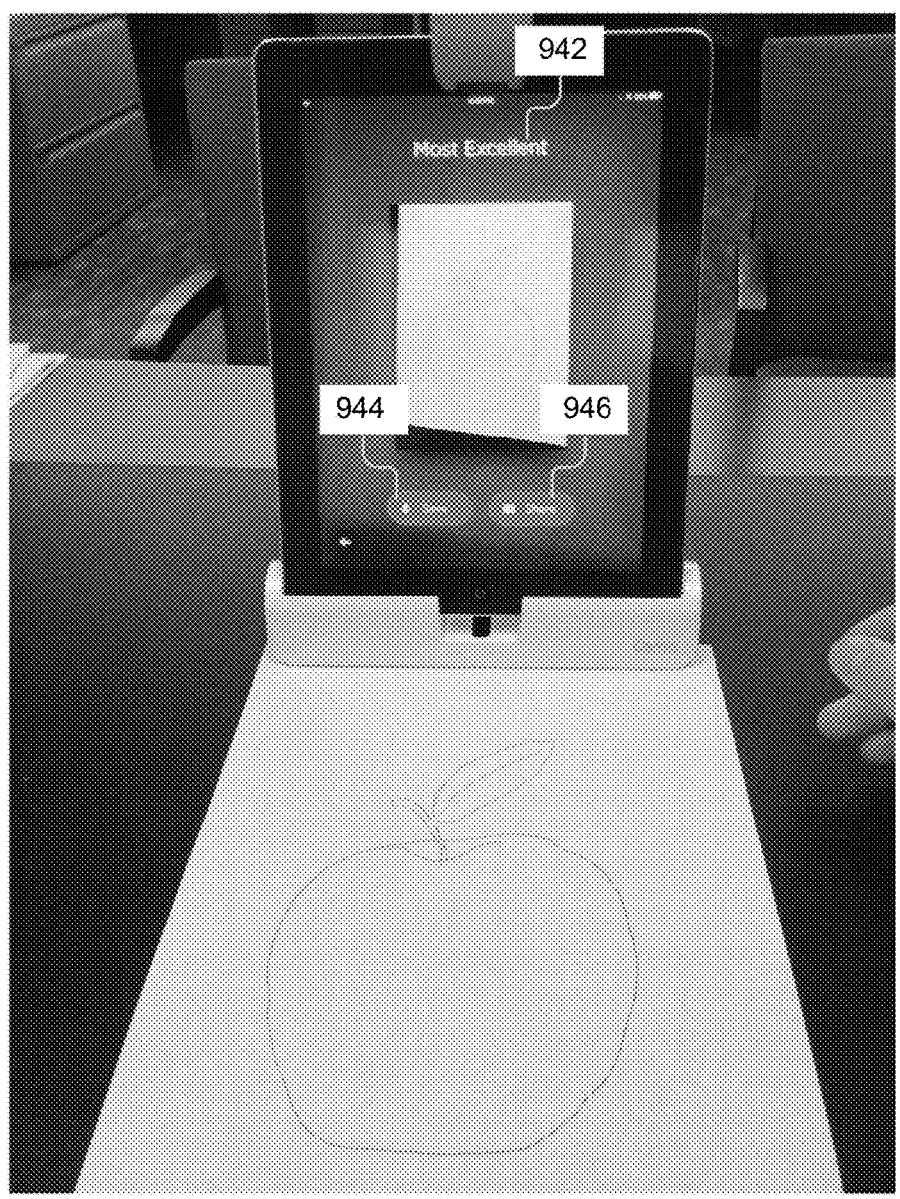

934. In FIG. 9G, the scene 936 displays an example of a complete option 938 that a user may select when finished. In some embodiments, the complete option 938 may automatically appear based on the computer device 104 determining that the physical drawing 930 and the virtualization of the physical drawing 934 are substantially similar or that no additional lines have been added to the physical drawing 934 after a pre-defined period. In FIG. 9H, the scene 940 depicts an example of a user interface, displayed by the activity application 214, in response to the complete option 938 being selected. In this example, a message 942 may be present congratulating the user on completing the drawing. In some embodiments, the message 942 may be selected from a list of messages and displayed. In some embodiments, a save option 944 may be present, allowing a user to save portions of the process of creating the completed physical drawing 930. In some embodiments, a share option 946 may be present, allowing a user to share portions of the process of creating the completed physical drawing 930.

In one embodiment, a user may be able to save their progress on a particular drawing and the activity application 214 may store that progress for later access and/or retrieval via the history interface. In other embodiments, a user may input various keywords into a search interface of the activity application 214 and the activity application 214 may transmit the query via a network to online image database, and receive a response form the online image database providing a result set of images, which the activity application may display to the user for selection via a results interface. The user may select the image the user wishes to reproduce and the activity application 214 may request and receive a copy of the image from the corresponding host via the network and load the image for display to the user.

In some embodiments, the activity application 214 can provide dynamic feedback to the user as the user completes different portions of the drawing. For example, the detection engine 212 may detect the different strokes made by the user and based on these detected events, the activity application can provide directive feedback by indicating whether those portions were correctly drawn or not, for instance, by highlighting them in green and red, respectively. In further examples, when a user has successfully completed a drawing, the activity application may animate the image drawn by the user and/or supplement the image with corresponding additional content. For instance, as the user draws the lines of a drawing on the activity surface, the activity application may display those lines in the form of virtual gunpowder, and as the user successfully draws each line, the activity application may visually validate that line by virtually lighting the line on fire and turning it from virtual gunpowder to virtual smoke.

In some embodiments, as the user draws the line on an activity surface 102, the detection engine 212 identifies the physical contours of the line and generates corresponding virtual contours that are rendered by the activity application 214. The detection engine 212 may recognize the line by identifying its contours. The detection engine 212 may also identify various attributes of the line, such as colors, contrasting colors, depth, texture, etc. The detection engine 212 may provide a description of the line and the line's attributes to the activity application 214, which may use it to render the virtual representation of the physical object in the virtual environment.

It should be understood that the above-described example activities are provided by way of illustration and not limitation and that numerous additional use cases are contemplated and encompassed by the present disclosure. In the above description, for purposes of explanation, numerous specific details are set forth in order to provide a thorough understanding of the present disclosure. However, it should be understood that the technology described herein may be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of a hardware implementation, a software implementation, or implementations containing both hardware and software elements. For instance, the technology may be implemented in software, which includes but is not limited to firmware, resident software, microcode, etc. Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A computer-implemented method for monitoring user activity in a physical activity scene, comprising:
   determining, using a processor of a computing device, a traceable image and presenting the traceable image in an interface on a display of the computing device;
   capturing, using a video capture device coupled to the computing device, a video stream of a physical activity surface proximate to the computing device;
   displaying, on the display of the computing device, the captured video stream overlaid with the traceable image in the interface;
   processing, using the processor of the computing device, the video stream captured by the video capture device to detect a contour of a work being created by a user on the physical activity surface;
   comparing, using the processor of the computing device, the contour of the work with a corresponding portion of the traceable image;
   determining, using the processor of the computing device, an accuracy of the contour relative to the corresponding portion of the traceable image based on the comparison;
   determining, using the processor of the computing device, a progress of the user in creating a work on the physical activity surface based on the accuracy; and
   updating, using the processor of the computing device, the interface to include the progress of the user.

2. The method of claim 1, further comprising:
   determining, using the processor of the computing device, directive feedback based on the comparison between the contour of the work and the corresponding portion of the traceable image; and
   updating, using the processor of the computing device, the interface to include the directive feedback.

3. The method of claim 2, wherein the comparison indicates a difference between the contour of the work and the corresponding portion of the traceable image, and the directive feedback highlights the difference.

4. The method of claim 1 further comprising:
   detecting, using the processor of the computing device, a new contour on the physical activity surface;
   generating, using the processor of the computing device, a visualization of the new contour; and
   updating the interface with the visualization of the new contour overlaid on a corresponding portion of the traceable image.

5. The method of claim 1, wherein displaying the captured video stream overlaid with the traceable image includes displaying an image frame from the captured video stream overlaid with the traceable image.

6. The method of claim 1, wherein the traceable image is semi-transparent.

7. The method of claim 1 wherein generating a traceable image further comprises:
   receiving, using the processor of the computing device, a captured image;
   detecting, using the processor of the computing device, contours in the captured image; and
   generating, using the processor of the computing device, the traceable image based on the contours in the captured image.

8. The method of claim 1, further comprising:
   detecting, using the processor of the computing device, one or more of a resize instruction and a reposition instruction;
   modifying, using the processor of the computing device, the traceable image based on the one or more of the resize instruction and the reposition instruction; and
   updating the interface to display the modified traceable image.

9. A computer-implemented method comprising:
   determining, using a processor of a computing device, a traceable image and presenting the traceable image in an interface on a display of the computing device;
   capturing, using a video capture device coupled to the computing device, a video stream of a physical activity surface proximate to the computing device;
   displaying, on the display of the computing device, the captured video stream overlaid with the traceable image in the interface, the video stream depicting a work being created by a user on the physical activity surface;
   determining, using the processor of the computing device, an accuracy of the work relative to the traceable image;
   determining, using the processor of the computing device, a progress of the user in creating the work on the physical activity surface based on the accuracy; and
   updating, using the processor of the computing device, the interface to include the progress of the user.

10. A computer-implemented method of claim 9, further comprising:
    processing, using a processor of a computing device, the video stream to detect a change in the work being created by the user in the physical activity surface;
    tracking, using the computing device, the progress of the work in comparison to the traceable image depicted in the interface displayed on the computing device, by evaluating which portion of the traceable image the change in the work relates to; and
    updating, using a processor of a computing device, the interface displayed on the computing device with a visual indication of the tracked progress.

11. The method of claim 9, further comprising:
    generating, using a processor of a computing device, the traceable image by detecting contour lines of an image and generating the traceable image based on the contour lines.

12. The method of claim 10, wherein detecting the change in the work includes detecting, using the processor of the computing device, a change in a contour.

13. The method of claim 9, wherein the computing device is a tablet computer, a smartphone, a laptop computer, or a desktop computer.

14. The method of claim 10, wherein the visual indication of the tracked progress includes generating corresponding virtual contours based on the change in the contour and rendering the corresponding virtual contours overlaid on the traceable image displayed in the interface.

15. The method of claim 9, further comprising:
    processing, using the processor of the computing device, the video stream captured by the video capture device to detect a contour of a work being created by a user on the physical activity surface;
    comparing, using the processor of the computing device, the contour of the work with a corresponding portion of the traceable image;
    determining, using the processor of the computing device, directive feedback based on the comparison between the contour of the work and the corresponding portion of the traceable image; and
    updating, using the processor of the computing device, the interface to include the directive feedback.

16. The method of claim 15, wherein the comparison indicates a difference between the contour of the work and the corresponding portion of the traceable image, and the directive feedback highlights the difference.

17. The method of claim 9, further comprising:
    processing, using the processor of the computing device, the video stream to detect an object in the physical activity surface;
    determining, using the processor of the computing device, a relative position of the object in relation to the traceable image displayed on the interface; and
    displaying on the interface, a visualization of the object in relation to the traceable image.

18. The method of claim 9, wherein the physical activity surface is located in front of the display of the computing device or behind the display of the computing device.

19. A physical activity surface visualization system, comprising:
    a detection engine coupled via a communications bus to a video capture device configured to capture a video stream of a physical activity surface proximate to a computing device, the video stream depicting a work being created by a user on the physical activity surface, the detection engine further configured to process the video stream to detect a change in the work being created by a user in the physical activity surface; and
    an activity application executable by a processor of the computing device and configured to display an instructional image in an interface on a display of the computing device, the activity application further configured to determine an accuracy of the work relative to the instructional image, determine a progress of the work based on the accuracy, the interface displaying a visual indicator of the tracked progress and the instructional image.

20. The physical activity surface visualization system of claim 19, wherein the computing device is a tablet computer, a smartphone, a laptop computer, or a desktop computer.

21. The physical activity surface visualization system of claim 19, further comprising:
    a detachable camera adapter coupled to adapt the video capture device, the detachable camera adapter configured to alter a field of view of the video capture device to include the physical activity surface.

22. The physical activity surface visualization system of claim 21, wherein the detachable camera adapter includes one or more mirrors for redirecting the field of view of the video capture device to the physical activity surface.

* * * * *